United States Patent
Chen et al.

(10) Patent No.: US 9,584,980 B2
(45) Date of Patent: Feb. 28, 2017

(54) METHODS AND APPARATUS FOR POSITION ESTIMATION

(71) Applicant: QUALCOMM Incorporated, San Diego, CA (US)

(72) Inventors: Yin Chen, Campbell, CA (US); Hui Chao, San Jose, CA (US); Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/288,195

(22) Filed: May 27, 2014

(65) Prior Publication Data

US 2015/0350846 A1   Dec. 3, 2015

(51) Int. Cl.
   H04W 4/04   (2009.01)
   G06T 7/00   (2006.01)
   G01S 5/16   (2006.01)
   G01C 21/20   (2006.01)

(52) U.S. Cl.
   CPC ............. *H04W 4/04* (2013.01); *G01C 21/206* (2013.01); *G01S 5/16* (2013.01); *G06T 7/0044* (2013.01)

(58) Field of Classification Search
   CPC ........ H04W 4/04; H04W 4/025; H04W 64/00; H04N 7/188; H04N 5/23238; H04M 3/42348; G06T 7/0044; G01S 5/16; G01C 21/206
   USPC ........ 455/456.1–457, 404.1–404.2, 418–420
   See application file for complete search history.

(56) References Cited

U.S. PATENT DOCUMENTS

| | | |
|---|---|---|
| 7,330,112 B1 | 2/2008 | Emigh et al. |
| 8,098,899 B2 | 1/2012 | Ohashi |
| 8,131,118 B1 | 3/2012 | Jing et al. |
| 8,447,273 B1 | 5/2013 | Friedlander et al. |
| 8,587,670 B2 | 11/2013 | Wood et al. |
| 2002/0137528 A1* | 9/2002 | Fraccaroli .................... 455/457 |
| 2004/0243303 A1 | 12/2004 | Padmanabhan |

(Continued)

FOREIGN PATENT DOCUMENTS

| | | |
|---|---|---|
| EP | 1897767 A1 | 3/2008 |
| EP | 2503766 A2 | 9/2012 |
| WO | 2011060335 A1 | 5/2011 |

OTHER PUBLICATIONS

Li, X., et al., "Vision-based Positioning with a Single Camera and 3D Maps: Accuracy and Reliability Analysis," Journal of Global Positioning Systems (2011), vol. 10, No. 1, pp. 19-29.

(Continued)

*Primary Examiner* — Michael Mapa
(74) *Attorney, Agent, or Firm* — Silicon Valley Patent Group LLP

(57) ABSTRACT

Systems, apparatus and methods disclosed herein facilitate vision based mobile device location determination. In some embodiments, a method for estimating a position of a mobile device may comprise: detecting that the mobile device is in communication with at least one of a plurality of devices, where each of the plurality of devices associated with a corresponding device identifier. The capture of at least one image by an image sensor coupled to the mobile device may be triggered, based, in part on: the device identifier corresponding to the device in communication with the mobile device, and/or a field of view of the image sensor. A location of the mobile device may then be determined, based, in part, on the at least one captured image.

26 Claims, 15 Drawing Sheets

(56) References Cited

U.S. PATENT DOCUMENTS

| | | | |
|---|---|---|---|
| 2006/0044407 A1* | 3/2006 | Barbeau | G06F 17/30265 |
| | | | 348/211.3 |
| 2007/0219706 A1 | 9/2007 | Sheynblat | |
| 2007/0232327 A1 | 10/2007 | Laroia et al. | |
| 2008/0125078 A1 | 5/2008 | Morimoto | |
| 2008/0273109 A1 | 11/2008 | Bamford | |
| 2010/0023251 A1 | 1/2010 | Gale et al. | |
| 2010/0029328 A1 | 2/2010 | Kuo et al. | |
| 2010/0125407 A1* | 5/2010 | Cho | G01C 21/3602 |
| | | | 701/533 |
| 2011/0032152 A1 | 2/2011 | Lo et al. | |
| 2011/0082638 A1 | 4/2011 | Khorashadi et al. | |
| 2011/0087431 A1 | 4/2011 | Gupta et al. | |
| 2011/0137561 A1 | 6/2011 | Kankainen | |
| 2011/0276266 A1 | 11/2011 | Ballew et al. | |
| 2012/0003956 A1 | 1/2012 | Austin et al. | |
| 2012/0016872 A1 | 1/2012 | Khorashadi et al. | |
| 2012/0044265 A1 | 2/2012 | Khorashadi et al. | |
| 2012/0210356 A1* | 8/2012 | Kiok | H04N 21/23109 |
| | | | 725/39 |
| 2013/0017842 A1 | 1/2013 | Gupta et al. | |
| 2013/0040600 A1 | 2/2013 | Reitnour et al. | |
| 2013/0045751 A1 | 2/2013 | Chao et al. | |
| 2013/0053056 A1 | 2/2013 | Aggarwal et al. | |
| 2013/0100306 A1* | 4/2013 | Bekiares | G08B 13/19689 |
| | | | 348/211.99 |
| 2013/0157697 A1* | 6/2013 | Kang | H04W 4/02 |
| | | | 455/457 |
| 2013/0238234 A1 | 9/2013 | Chao et al. | |
| 2013/0308835 A1* | 11/2013 | Thorson | H04M 1/72563 |
| | | | 382/118 |
| 2014/0257688 A1 | 9/2014 | Chao | |
| 2014/0295887 A1* | 10/2014 | Redfern | 455/456.3 |

OTHER PUBLICATIONS

Liang, J.Z., et al., "Image Based Localization in Indoor Environments," 2013 Fourth International Conference on Computing for Geospatial Research and Application (COM.Geo), 2013, pp. 70-75.
International Search Report and Written Opinion—PCT/US2015/029312—ISA/EPO—Jul. 28, 2015.

* cited by examiner

470

METHODS AND APPARATUS FOR POSITION ESTIMATION

FIELD

The subject matter disclosed herein relates to the determination of mobile device locations.

BACKGROUND

In vision based positioning systems, identification of landmarks and/or points of interest in images may be used in conjunction with the known positions of the landmarks and/or points of interest to estimate the location of a mobile device. Vision based positioning may be useful is situations where Global Navigation Satellite Systems (GNSS) such as the Global Positioning System (GPS) or other network based positioning techniques are less effective. For example, GPS based positioning may not be effective within a building, or in dense urban areas due to signal unavailability, signal losses and/or other factors. Landmark or vision based positioning may also provide an alternate location estimation technique that can be used to increase the reliability and accuracy of location estimates obtained using other techniques.

While vision based positioning of mobile devices can be useful, there may be situations where user invocation of vision based positioning (VBP) may be cumbersome, impractical or difficult. For example, older users or young children may be able to make calls but may experience difficulty in using vision based positioning systems. In another instance, during an emergency, the user may not be in a state of mind and/or have the time to invoke a vision based positioning application.

Therefore, there is a need for systems and methods to enhance the usability of vision based location estimations provided by vision based positioning systems.

SUMMARY

In some embodiments, a method for estimating a position of a mobile device may comprise: detecting that the mobile device is in communication with one of a plurality of devices, wherein each of the plurality of devices is associated with a corresponding device identifier. The capture of at least one image by an image sensor coupled to the mobile device may be triggered, based, in part on: a device identifier corresponding to the device communicating with the mobile device, or a field of view of the image sensor; or a combination thereof. A location of the mobile device may then be determined based, in part, on the at least one captured image.

In another aspect, a mobile device may comprise: a memory; an image sensor; and a processor coupled to the image sensor and the memory. In some embodiments, the processor may be configured to: detect that the mobile device is in communication with one of a plurality of devices, each device in the plurality of devices associated with a corresponding device identifier and trigger the capture of at least one image by the image sensor. The capture of the at least one image may be triggered based, in part on: a device identifier corresponding to the device communicating with the mobile device, or a field of view of the image sensor, or a combination thereof. A location of the mobile device may be determined based, in part, on the at least one captured image.

In a further aspect, a mobile device may comprise: means for detecting that that the mobile device is in communication with one of a plurality of devices, each device in the plurality of devices associated with a corresponding device identifier in the stored plurality of device identifiers; and means for triggering the capture of at least one image by an image sensing means. The capture of the at least one image may be triggered based, in part on: the device identifier corresponding to the device in communication with the mobile device, or a field of view of the image sensor means; or a combination thereof. The mobile device may further comprise, means for determining a location of the mobile device based, in part, on the at least one captured image.

Further, in some embodiments, a computer-readable medium may comprise instructions, which when executed by a processor, may perform steps in a method for estimating a position of a mobile device. In some embodiments, the steps may comprise: detecting that the mobile device is in communication with one of a plurality of devices, wherein each of the plurality of devices is associated with a corresponding device identifier, and triggering the capture of at least one image by an image sensor coupled to the mobile device based, in part on: a device identifier corresponding to the device communicating with the mobile device, or a field of view of the image sensor; or a combination thereof. The steps mat further comprise determining a location of the mobile device based, in part, on the at least one captured image.

DETAILED DESCRIPTION

The detailed description set forth below in connection with the appended drawings is intended as a description of some exemplary non-limiting embodiments and various other embodiments may be practiced and are envisaged as would be apparent to one of skill in the art. Embodiments described are provided merely as examples or illustrations of the present disclosure. The detailed description includes specific details for the purpose of providing a thorough understanding of the present disclosure. However, it will be apparent to those skilled in the art that the present disclosure may be practiced without one or more of these specific details. In some instances, well-known structures and devices are not shown in block diagram form in order to avoid obscuring the concepts of the present disclosure. Acronyms and other descriptive terminology may be used merely for convenience and clarity and are not intended to limit the scope of the disclosure.

Vision based mobile device location techniques described herein may be implemented in conjunction with various wireless networks, including wireless communication networks such as a wireless local area network (WLAN), a wireless personal area network (WPAN), wireless wide area network (WWAN) and so on. The term "Vision Based Positioning" (VBP) is used herein to refer to the determination of a location of the device based on one or more images captured by the device. In referring to the process of determining the location of a mobile device using a positioning system, the terms location estimation, locating and positioning are often used interchangeably.

The term landmark or "point of interest" (POI) refers to distinct features in the environment around the mobile device, which may be natural or manmade and may be indoors or outdoors. POIs may include various objects with distinguishing features including structures, kiosks, buildings, storefronts, natural features, signs of various types, such as name boards, office numbers, store signs, logos, billboards, etc. The terms landmark or POI are often used interchangeably. The locations of POIs may be known in advance and stored along with maps, including visibility maps of and/or related to the POI, images of the POIs and distinctive features of the POIs identified in the stored images.

Typically, the pose, which is the position and orientation of the mobile device relative to one or more known landmarks, in conjunction with the known position of the landmark/POI may be used to estimate the location of the mobile device. When optical sensors such as image sensors on or coupled to mobile devices are used, the position of the mobile device can be estimated based on the identification of known landmarks in images of the environment around the mobile device taken by the image sensor.

Figure 1:
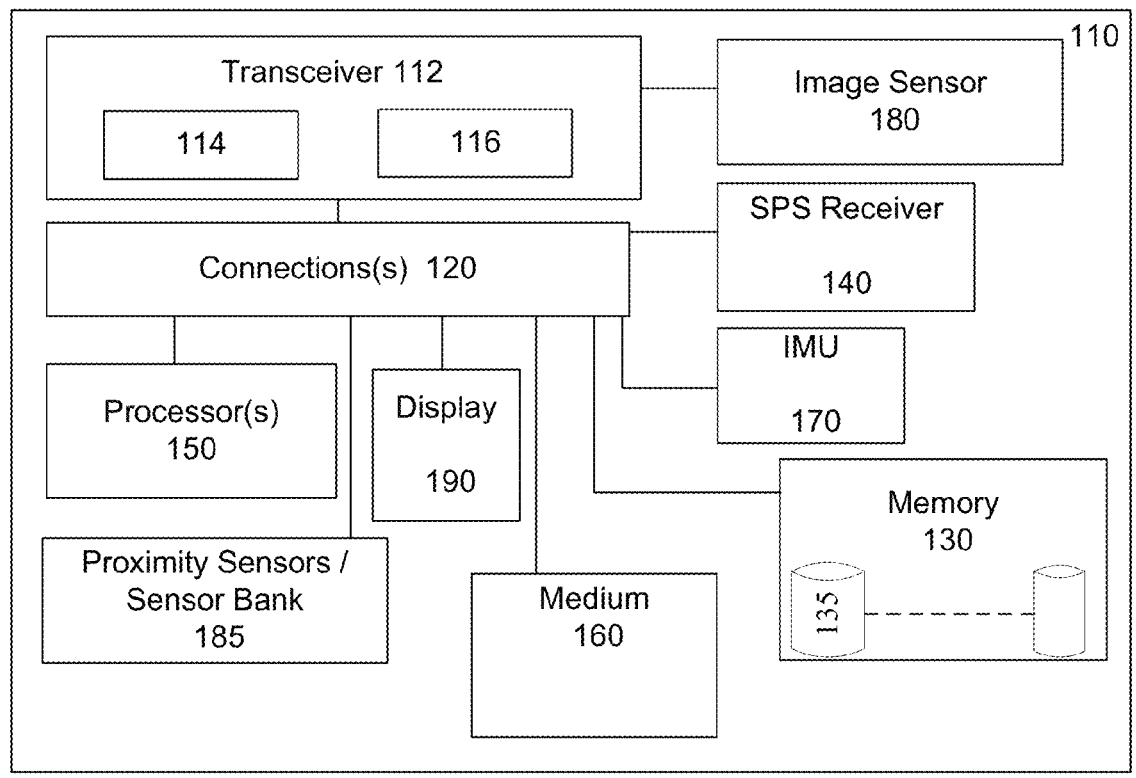
FIG. 1 shows a schematic block diagram illustrating certain exemplary features of a mobile device.

FIG. 1 shows a schematic block diagram illustrating certain exemplary features of mobile device 110. Note that the features and/or functional units shown in FIG. 1 are exemplary and for descriptive purposes only and one or more functional units may be omitted and/or other functional units may be added in a manner consistent with disclosed embodiments. Exemplary mobile device 110 may also be modified in various ways in a manner consistent with the disclosure, such as, by adding, combining, or omitting one or more of the functional blocks shown. For example, in some configurations, mobile device 110 may not include IMU 170 or SPS Receiver 140. In some embodiments, portions of mobile device 100 may take the form of one or more chipsets, and/or the like.

Mobile device 110 may be stationary or mobile and may also be referred to as a mobile terminal, mobile station, a user equipment (UE), an access terminal (AT), a subscriber station, a station (STA), etc. The term "mobile device" is also intended to include devices which communicate with a personal navigation device (PND), for example by using short-range wireless, infrared, wireline connection, or other connection—regardless of whether signal reception, assistance data reception, and/or position-related processing occurs at the device(s) or at the PND. Also, mobile device 110 may be a cellular phone, a personal digital assistant (PDA), a handheld device, a wireless device, a tablet, a laptop computer, a wireless modem, a cordless phone, a telemetry device, a tracking device, etc., which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile device."

Mobile device 110 may, for example, include various functional units such as one or more processing units or processor(s) 150, memory 130, transceiver 112 (e.g., wireless network interface), and (as applicable) an SPS receiver 140, camera(s)/optical sensor(s)/image sensor (hereinafter referred to as "image sensor") 180, and non-transitory computer-readable medium 160, which may comprise fixed and/or removable media in an exemplary removable media drive (not shown). The functional units in mobile device 110 may be operatively coupled through one or more connections 120 (e.g., buses, lines, fibers, links, etc.). In certain example implementations, all or part of mobile terminal 110 may take the form of a chipset, and/or the like.

In some embodiments, Satellite Positioning System (SPS) receiver 140, in mobile device 110, may be enabled to receive signals associated with one or more SPS resources. A satellite positioning system (SPS) typically includes a system of transmitters positioned to enable entities to determine their location on or above the Earth based, at least in part, on signals received from the transmitters, which may be located on ground based control stations, user equipment and/or space vehicles. In a particular example, such transmitters may be located on Earth orbiting Satellite Vehicles (SVs). As used herein an SPS may include any combination of one or more global (such as Galileo, GPS, GLONASS etc), and/or regional navigation satellite systems such as satellite systems (such as QZSS, Beidou, IRNSS etc) and/or augmentation systems. Further SPS signals may include SPS, SPS like, and/or other signals associated with such one or more SPS. Mobile device 110 may be able to determine its position based on signals received from one or more SPS.

In some embodiments, mobile device 110 may also comprise transceiver 112, which may include a transmitter 114 enabled to transmit one or more signals over one or more types of wireless communication networks and a receiver 116 to receive one or more signals transmitted over the one or more types of wireless communication networks. For example, transmitter 114 and receiver 116 may be able to communicate with wireless networks including Wireless Local Area Networks (WLANs), Wireless Personal Area Networks (WPANs), Wireless Wide Area Networks (WWANs)/cellular networks, femtocells, and various other types wireless communication networks.

WWANs or cellular networks may include a Code Division Multiple Access (CDMA) 1× networks, a High Rate Packet Data (HRPD) network, a Wideband CDMA (WCDMA) network, a Global System for Mobile Communications (GSM) network, a General Packet Radio Service (GPRS) network, a Long Term Evolution (LTE) network, or some other wireless network. GSM, WCDMA and GPRS are part of Universal Mobile Telecommunications System (UMTS). LTE is part of Evolved Packet System (EPS). CDMA 1× and HRPD are part of cdma2000. GSM, WCDMA, GPRS and LTE are described in documents from a consortium named the "3rd Generation Partnership Project" (3GPP). CDMA 1× and HRPD are described in documents from a consortium named the "3rd Generation Partnership Project 2" (3GPP2).

WLANs may include, for example, wireless networks compatible with the Institute of Electrical and Electronics Engineers (IEEE) 802.11x family of standards, which may also be referred to as a Wi-Fi network. Such a network may also include Access Points or Wireless Access Points (APs or WAPs) that couple wireless communication devices to the WLAN. APs acts as a central transmitter and receiver of WLAN radio signals. WPANs may include Bluetooth networks, networks based on the IEEE 802.15x family of standards, or some other types of networks.

In some embodiments, mobile device 110 may comprise image sensor 180 such as optical sensor(s), a plurality of CCD or CMOS sensors and/or image sensor, which are hereinafter referred to as "image sensor 180". Image sensor 180 may convert an optical image into an electronic or digital image and may send captured images to processor(s) 150. In some embodiments, image sensor 180 may be housed in a wearable display, which may be operationally coupled to, but housed separately from, processors 150 and/or other functional units in mobile device 110.

Image sensor 180 may send captured images to processor(s) 150. In some embodiments, Image sensor 180 may comprise front-facing and rear facing image sensor and may also incorporate CMOS sensors. In general, image sensor 180 may include color or grayscale image sensor, video and/or still cameras, and/or RGB-D cameras, which capture color images in a Red-Green-Blue (RGB) format along with per-pixel depth information. In some embodiments, an RGBD camera, an ultrasonic sensor, or another sensor may be able to determine depth or distance information for POIs in conjunction with the capture of images of the object by image sensor 180.

In one embodiment, image sensor 180 may comprise a front facing camera, which may face the user during normal user operation of the device, and a rear facing camera, which may face away from the user during normal operation of the device. In one embodiment, images captured by image sensor 180 may be in a raw uncompressed format and may be compressed prior to being processed and/or stored in memory 130 and/or medium 60. In some embodiments, image compression may be performed by processor(s) 150 using lossless or lossy compression techniques. In embodiments with RGB-D cameras, the image may be processed and stored along with the depth/distance related information. In some embodiments, the depth/distance information may be used by processor(s) 150 for location determination of mobile device 110.

In some embodiments, processor(s) 150 may also receive input from IMU 170. In some embodiments, IMU 170 may comprise 3 axis accelerometer(s), 3-axis gyroscope(s), and/or magnetometer(s). IMU 170 may provide velocity, orientation, and/or other position related information to processor(s) 150. In some embodiments, IMU 170 may output measured information in synchronization with the capture of each image frame by image sensor 180. In some embodiments, the pose of image sensor 180 relative to an image may be determined or corrected based, in part, on input from IMU 170. In some embodiments, known intrinsic parameters and characteristics of image sensor 180 such as the focal length of the lens, image sensor focus distance etc. may be used in conjunction with input from IMU 170 to assist with and/or refine image sensor pose determination. In some embodiments, the estimated pose of the mobile device relative to a POI corresponding POI and a confidence interval associated with the estimated pose may be determined based on the mobile device captured images. In some embodiments, images captured by image sensor 180 may be used to recalibrate or perform bias adjustments for IMU 170.

Processor(s) 150 may be implemented using a combination of hardware, firmware, and software. In some embodiments, processor(s) 150 may represent one or more circuits configurable to perform at least a portion of a data signal computing procedure or process related to the operation of mobile device 110. Processor(s) 150 may be capable of triggering the capture of images by image sensor 180 in response to the sensing of one or more conditions, receiving instructions/data from receiver 116 and/or retrieving instructions/data from memory 130 and/or computer readable medium 160 and may respond to the instructions and/or send data/results using transceiver 112. Processor(s) 150 may also be capable of processing various other received information either directly or in conjunction with one or more other functional blocks shown in FIG. 1. For example, processor(s) 150 may process images received from image sensor 180 and/or stored in memory 130 or computer readable medium 160. For example, processor(s) 150 may implement VBP techniques. In some embodiments, processor(s) 150 may process images taken by image sensor 180 to determine a location of mobile device 110. The images may be one or more still images or a video sequence. For example, processor(s) 150 identify one or more landmarks or POIs in the images, and generate and/or process one or more visibility maps based on the identified landmarks to determine a position of mobile device 110. Processor(s) 150 may also obtain and use other information, such as output from IMU 170 and/or depth information from image sensor 180, prior location information based on SPS signals, or trilateration based on Round Trip Time (RTT) and/or Received Signal Strength Indicator (RSSI) measurements, etc. during position determination of mobile device 110. Processor(s) 150 may also be capable of performing various other functions described herein.

Processor(s) 150 may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof. For a firmware and/or software implementation, the methodologies may be implemented with modules (e.g., procedures, functions, and so on) that perform the functions described herein.

Any machine-readable medium tangibly embodying instructions may be used in implementing the methodologies described herein. For example, software code may be stored in a non-transitory computer-readable medium 160 and/or memory 130 and may be retrieved and executed by processor(s) 150. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions.

Memory 130 may be implemented within processor(s) 150 and/or external to processor(s) 150. As used herein the term "memory" refers to any type of long term, short term, volatile, nonvolatile, or other memory and is not to be limited to any particular type of memory or number of memories, or type of physical media upon which memory is stored. In some embodiments, memory 130 may hold configuration settings, information about mobile device 110 and functional units on mobile device 110 such as part and version numbers, capabilities, etc, code to facilitate the operation of mobile device 110, and other tasks performed by processor(s) 150. For example, memory 130 may hold images, map data, information pertaining to POIs, program data and results, outputs of various sensors such as IMU 170, proximity sensor 185, etc. In general, memory 130 may represent any data storage mechanism.

Memory 130 may also hold one or more databases 135 such as a map database, which may include 2-D and 3-D maps, POI databases, locations of POIs, images of POIs, features of POIs etc. In some embodiments, the maps may include one or more POI visibility maps, which may comprise a set of grid points. In some embodiments, medium 160 and/or memory 130 may comprise one or more databases that may hold information pertaining to various POI entities for a region around a current location of mobile device 110. In some embodiments, POI related information may include images of the POIs, locations of the POIs, POI features for Scale Invariant Feature Transform (SIFT), Speeded Up Robust Features (SURF), or other image matching algorithms, visibility maps for the POIs, etc. In some embodiments, information stored in databases 135 in memory 130 may retrieved from computer readable medium 160 and/or received over a wireless network. For example, mobile device 110 may receive map databases and/or a POI database relevant to an area around a current location of mobile device 110 over a wireless network or by loading relevant information from computer readable medium 160. Memory 130 may include, for example, a primary memory and/or a secondary memory. Primary memory may include, for example, a random access memory, read only memory, etc. While illustrated in FIG. 1 as being separate from processor(s) 150, it should be understood that all or part of a primary memory may be provided within or otherwise co located and/or coupled to processor(s) 150. In one embodiment, a server, such as a location server may send map and POI databases for a serving cell or a region covered by a wireless network to mobile device 110, when mobile device 110 registers with the network or at some point thereafter.

Secondary memory may include, for example, the same or similar type of memory as primary memory and/or one or more data storage devices or systems, such as, for example, flash/USB memory drives, memory card drives, disk drives, optical disc drives, tape drives, solid state memory drives, etc. In certain implementations, secondary memory may be operatively receptive of, or otherwise configurable to couple to a non-transitory computer-readable medium 160 in a removable media drive (not shown) coupled to mobile device 110. In some embodiments, non transitory computer readable medium may form part of memory 130 and/or processor(s) 150.

Further, in certain example implementations, mobile device 110 may include a variety of other sensors such as a proximity sensor, which may be one of several sensors shown in FIG. 1 as sensor bank 185. In some embodiments, the proximity sensor may provide signal or other indication based on the proximity of a section of mobile device 110 to the user. For example, in one embodiment, proximity sensor may provide an indication when the speaker or earpiece of mobile device 110 is proximate to and/or in physical contact with the user. Proximity sensors may be electrical (e.g. inductive or capacitive), optical. (e.g. infra-red or laser) magnetic or sonar. In some embodiments, the proximity sensors may be passive (e.g. by measuring some environmental characteristic to determine user proximity) or active (e.g. may generate signals and measure signal parameters to determine user proximity).

The output of proximity sensors may be binary (e.g. "near" or "far"; "in contact" or "not in contact") or may vary based on the distance of some specific section of mobile device 110 (e.g. the earpiece) from the user. In some embodiments, the output of a continuously varying proximity sensor may be thresholded to produce a binary output. In some embodiments, the output of proximity sensor may be used by processor(s) 150 to enable and/or disable one or more applications on mobile device 110. In some embodiments, the output of proximity sensor may be used, at least in part, to trigger location determination based on at least image captured by image sensor 180 coupled to mobile device 100. For example, a vision based location application on mobile device 110 may be triggered. As another example, in embodiments where image sensor 180 is wearable, mobile device 110 may not comprise a proximity sensor or the output of proximity sensor may be ignored and image based location determination and/or a vision based location application may be triggered based on configuration settings that identify mobile device 110 as having a wearable image sensor 180 and/or an image sensor 180 with a typically available field of view, and/or other information provided by the an operating system, application, and/or image sensor 180, and/or other criteria consistent with embodiments disclosed herein. Sensor bank 185 may further include one or more additional sensors such as an ambient light sensor, microphones, acoustic sensors, ultrasonic sensors etc.

Further, mobile device 110 may include a screen or display 190 capable of rendering color images, including 3D images. In some embodiments, display 190 may be used to display live images captured by image sensor 180, AR images, Graphical User Interfaces (GUIs), program output, etc. In some embodiments, display 190 may comprise and/or be housed with a touchscreen to permit users to input data via some combination of virtual keyboards, icons, menus, or other Graphical User Interfaces (GUIs), user gestures and/or input devices such as a stylus and other writing implements. In some embodiments, display 190 may be implemented using a Liquid Crystal Display (LCD) display or a Light Emitting Diode (LED) display, such as an Organic LED (OLED) display. In other embodiments, display 190 may be a wearable display or a heads-up display, which may be operationally coupled to, but housed separately from, other functional units in mobile device 110. In some embodiments, mobile device 110 may comprise ports to permit the display of the MR images through a separate monitor coupled to mobile device 110.

Not all modules comprised in mobile device 110 have been shown in FIG. 1. Exemplary mobile device 100 may also be modified in various ways in a manner consistent with the disclosure, such as, by adding, combining, or omitting one or more of the functional blocks shown. For example, in some configurations, mobile device 110 may take the form of a gaming or other devices that may not be configured to connect to a network or otherwise communicate, either wirelessly or over a wired connection, with another device. Thus, embodiments disclosed herein may be used in a standalone AR system/device, for example, in a mobile device that does not require communication with another device. As another example, in embodiments where image sensor 180 is wearable, mobile device 110 may not comprise a proximity sensor.

Figure 2:
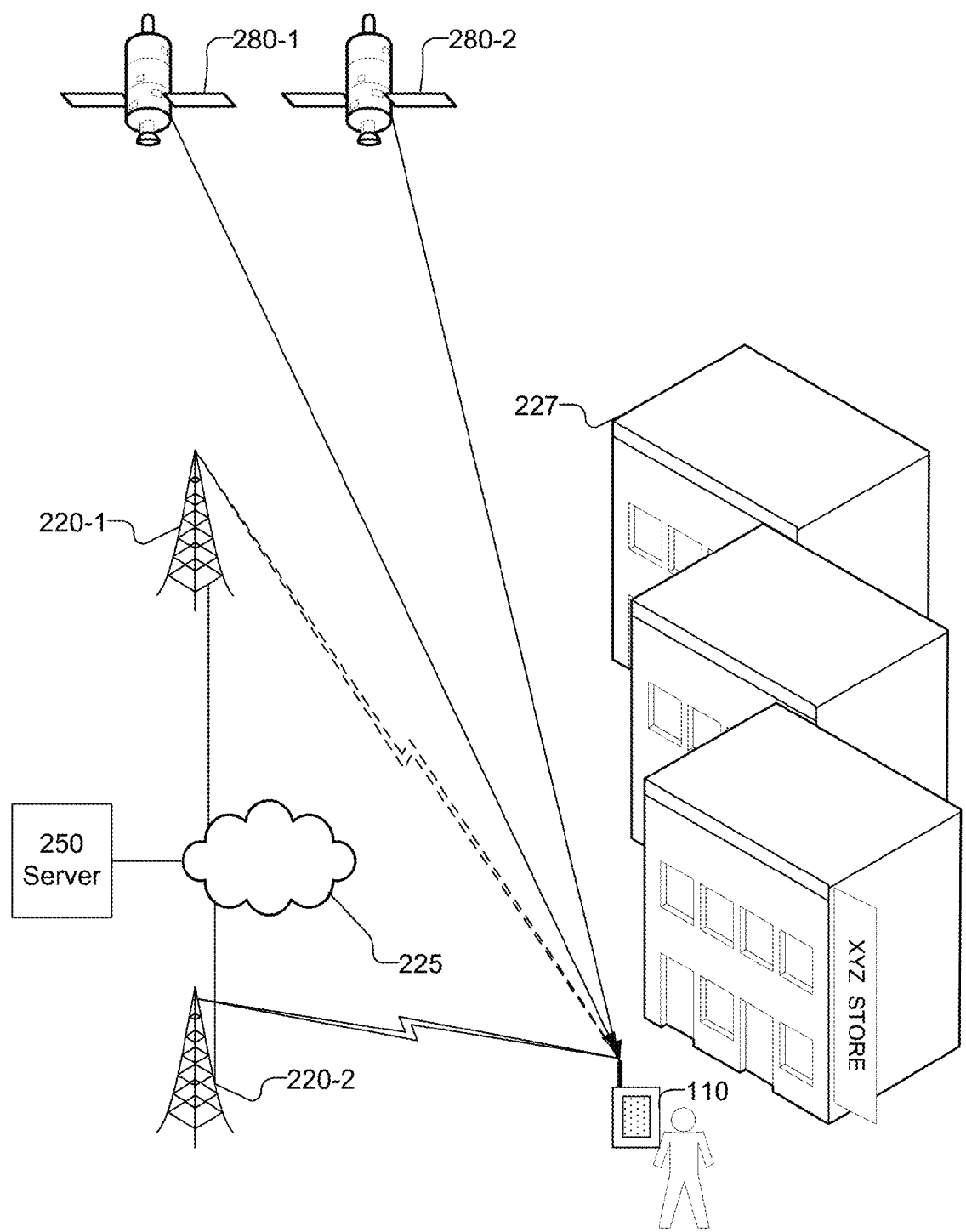
FIG. 2 shows a user at a location where a mobile device may receive positioning signals such as GPS signals from Satellite Vehicles (SVs) and/or wireless networks.

FIG. 2 shows a user at a location where mobile device 110 may receive positioning signals such as GPS signals from satellites such as Satellite Vehicles (SVs) 280-1 and/or 280-2 and/or wireless network 225. For simplicity only two satellites have been shown in FIG. 2. In general, mobile device 110 may receive signals from a plurality of SVs 280. Further, mobile device 110 may communicate with wireless network 225, which may take the form of a cellular network, though APs 220-1 or 220-2, which may be Node Bs, Base Transceiver Stations (BTS), evolved Node B's (eNode B), etc. mobile device 110 may be able to compute its location based on signals received from SVs 280 and/or by trilateration of RTT/RSSI measurements of signals received from wireless network 225.

Mobile device 110 may also receive location assistance information from server 250 and/or communicate with server 250 during location determination. For example, server 250 may have map and POI information related to the area around a current location of mobile device 110. In some embodiments, server 250 may be part of a cellular network and may have map and POI related information for the serving cell and one or more neighboring cells. In some embodiments, the map and POI related information may be held in one or more databases and may be sent to, retrieved by and/or downloaded to local storage on mobile device 110. For simplicity only one server and one mobile device are shown in FIG. 2A. However, in general, there may multiple servers in communication with one or more mobile devices at any time.

FIG. 2 shows the user in a location where signal reception from SVs 280 and/or wireless network 225 may be possible. While mobile device 110 may have been able to receive GPS or Assisted GPS (A-GPS) signals for positioning just prior to entering building 227 such as a mall, in some instances, the user may not be able to consistently use GPS within the mall because mobile device 110 may not be able to acquire GPS signals at all times. In other situations, mobile device 110 may not be able to acquire GPA or A-GPS signals consistently in a dense outdoor environment because of signal losses or other environmental factors.

For example, if GPS or A-GPS signals are unavailable within building 227, the position of the user (or mobile device 110) just prior to entering building 227 may be used to approximate the location of mobile device 110 within building 227. In some embodiments, when GPS/A-GPS signals are unavailable, the most recent position fix obtained using SVs 280 and/or network 225 may be used as one approximation of a prior position of the mobile device 110. In some instances, the position of mobile device 110 may be further refined from the approximation above based on information received IMU 170. However, inaccuracies in location estimates may continue to arise because of errors or biases inherent in measurements by IMU 170. In some embodiments, location determination based on at least one captured image and/or vision based positioning may also be used to determine or refine the position of mobile device 110. For example, when position determination by other methods is impaired, location determination based on at least one captured image and/or vision based positioning techniques may be used in a manner consistent with disclosed embodiments to refine the position of mobile device 110. In some embodiments, the last or most recent position fix obtained using some combination of GPS/A-GPS, trilateration, network based positioning methods, and/or IMU based measurements may be used as an initial approximation of the location mobile device 110 when performing location determination based on at least one captured image and/or VBP.

Figure 3:
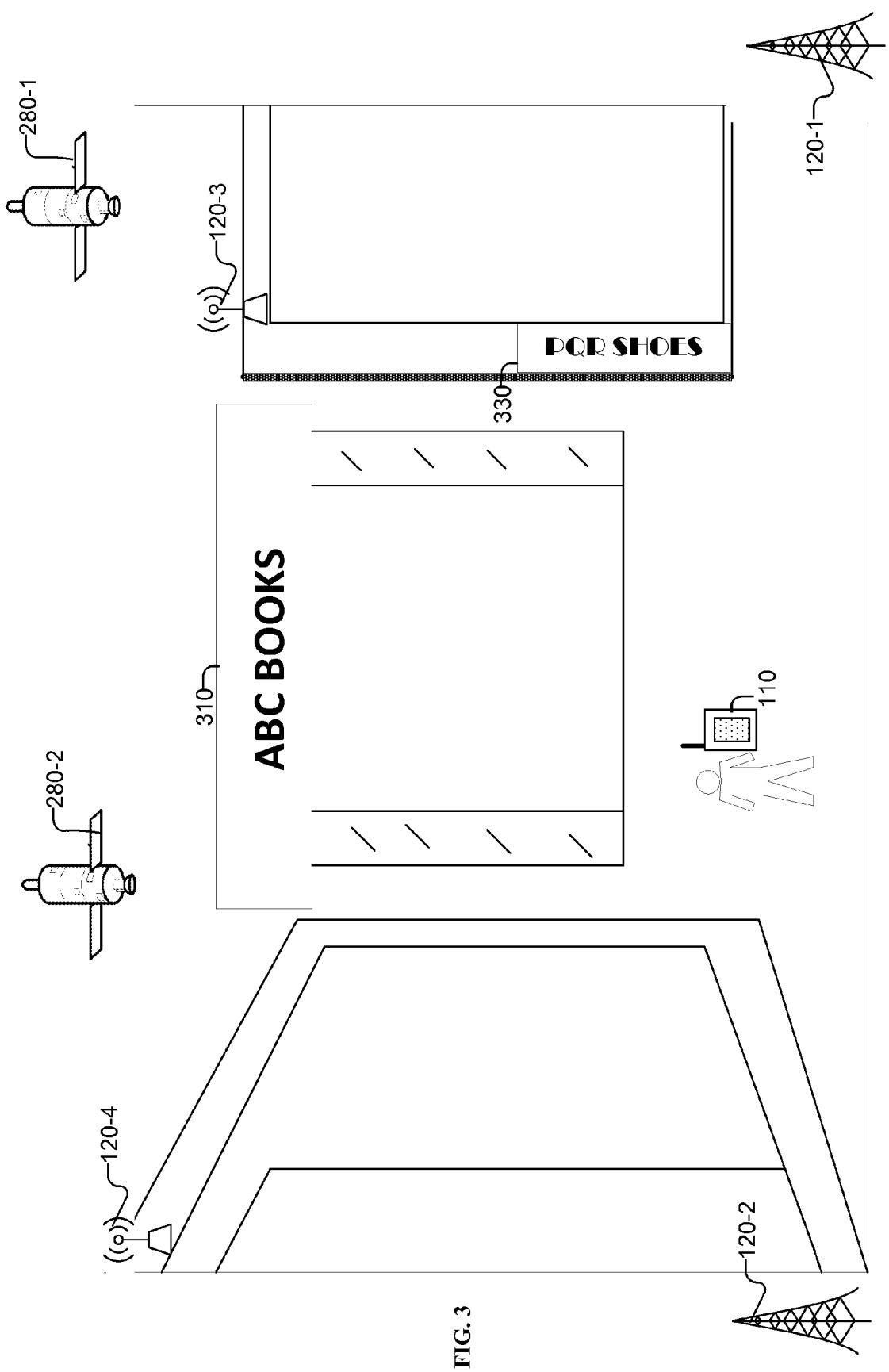
FIG. 3 shows user with a mobile device within a building such as a mall.

FIG. 3 shows user with a mobile device within a building such as a mall. As shown in FIG. 3, an image captured by image sensor 180 on mobile device 110 within the mall may show one or more store signs such as POIs 310 and 330, which are shown in FIG. 3 as stores "ABC BOOKS" and "PQR SHOES", respectively. As shown in FIG. 3, while in building 227, mobile device 110 may be able to receive signals from one or more of SVs 280, and/or APs 220. For example, APs 220-3 and 220-4 may be access points for a WLAN network deployed inside building 227 and may be accessible to mobile device 110. However, as discussed above, in some instances, mobile device 110 may receive signals from SVs 280 and/or APs 220-1 and 220-2 sporadically when within building 227.

Figure 4A:
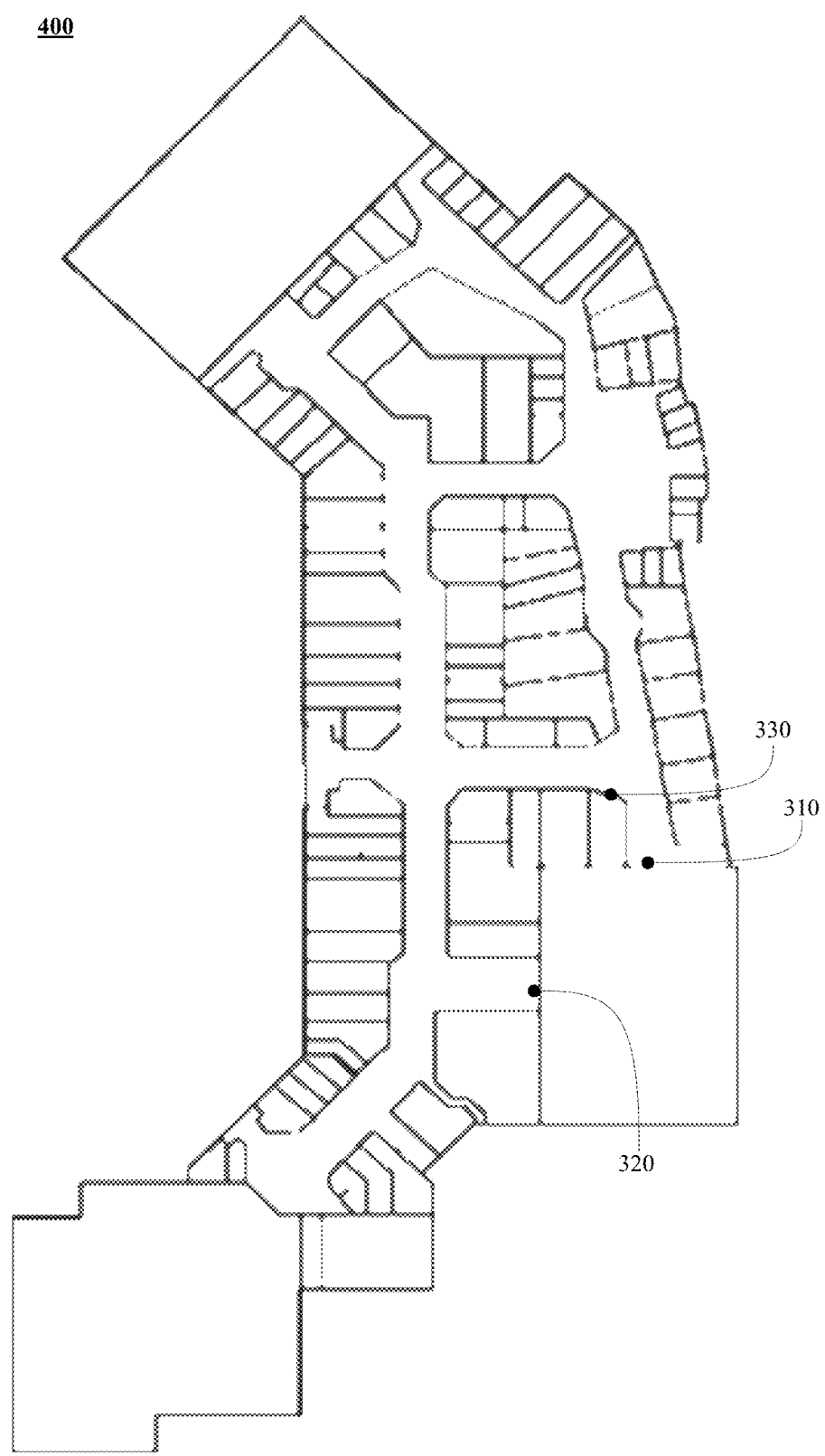
FIG. 4A shows an exemplary map of an indoor area, which may be a mall or the interior of a building or another structure.

FIG. 4A shows an exemplary map 400 of an indoor area, which may be a mall or the interior of building 227. Exemplary map 400 shows POIs 310, 320 and 330, which may be storefront signs in the mall. As shown in FIG. 3, POIs 310 and 330 may be storefront signs in the mall. Storefront signs may be considered as landmarks because of their distinctive nature. Referring to FIG. 4A, the exact locations of POIs 310, 320 and 330 may be known because they are in fixed locations, for example, at the entrances of their respective stores. Further, the locations of the stores in mall may be known and stored in a POI or map database. In some embodiments, maps and/or the locations of POIs 310, 320, and 330 may be stored in one or more databases, such as exemplary databases 135 on mobile device 110 and/or databases on server 250. In some embodiments, images and/or features associated with images of POIs 310, 320 and 330 may be stored in the databases and the images/image features may be associated with the respective POIs. In some embodiments, the maps associated with POIs may take the form of visibility maps which may be 2-Dimensional (2D) or 3-Dimensional (3D).

Figure 4B:
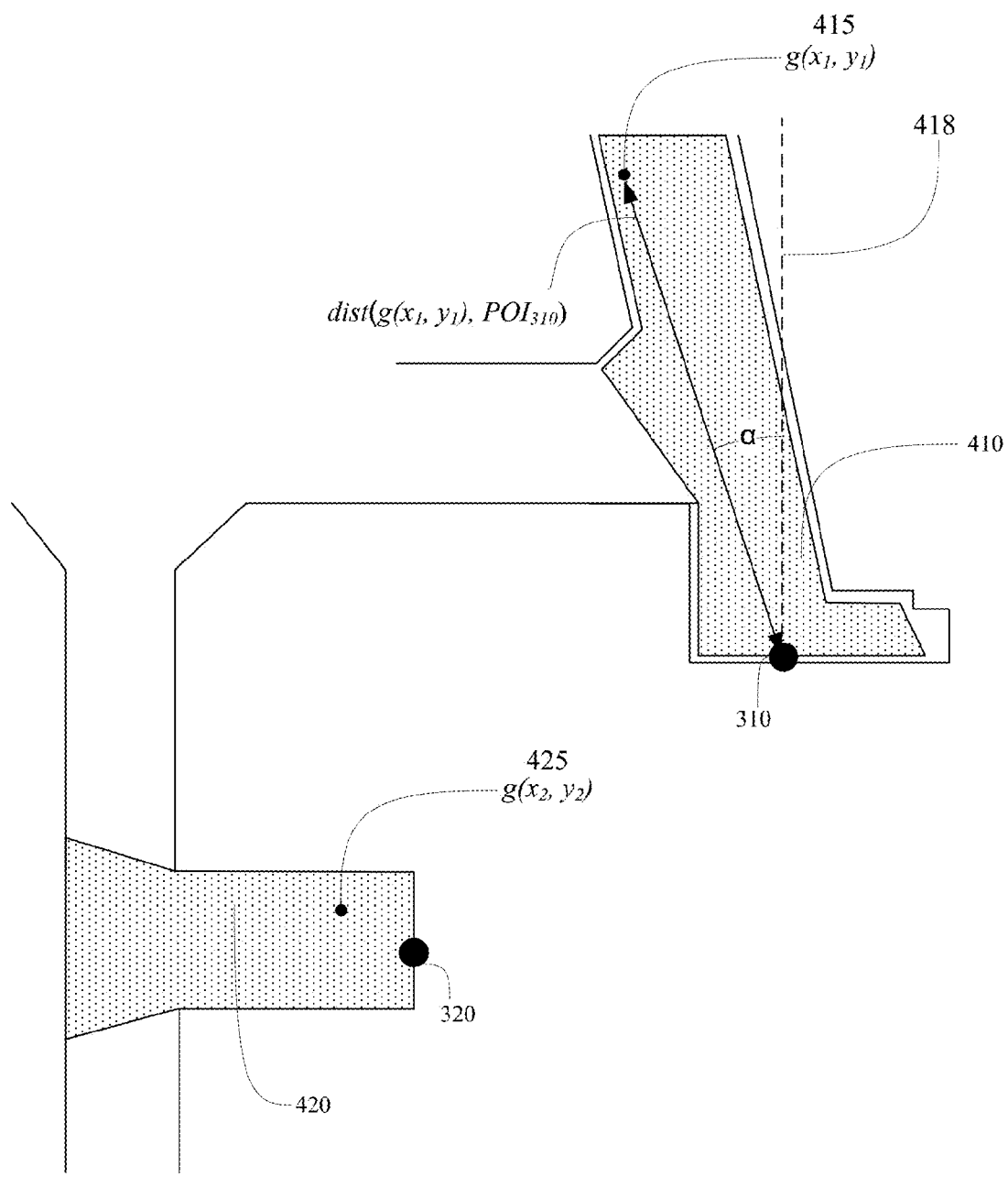
FIG. 4B shows an exemplary two-dimensional visibility map for a portion of map in FIG. 4A, which has been enlarged for clarity.

FIG. 4B shows an exemplary two-dimensional visibility map 450 for a portion of map 400, which has been enlarged for clarity. Visibility map 450 shows at least some of the regions visible to entities 310 and 320. In FIG. 4A, grid points have been added to indicate visibility information. A visibility map shows at least some of the regions visible to POIs 310 and 320. In other words, a visibility map provides a set of locations from which a POI is visible. The visibility map for an entity may be thought of as some or all of non-obscured areas within line of sight of the entity. The visibility map for an entity may also be thought of as showing all grid points g(x, y) on the map from where the entity is viewable.

Exemplary visibility map 450 shows that region 410 is visible to POI 310 (or conversely, POI 310 is visible to grid points in region 410) and that shaded region 420 visible to POI 320 (or conversely, POI 320 is visible to grid points in region 420). Thus, in FIG. 4A, a grid point $g(x_i, y_i)$ is in the line of sight of POI 310 if it lies in region 410, or in the line of sight of POI 320 if it lies in region 420. For example, when mobile device 110 takes captures an image of POI 310, mobile device 110 is in a line of sight of POI 310 and therefore located in visibility region 410. In some instances, mobile device 110 may be in a line of sight of several POIs and a VBP application may trigger the capture of a plurality of images, which may include some subset of the POIs.

Regions outside the shaded region are either not visible to the POI entity being considered, or may not be considered because they may lie outside some visibility threshold. For example, in some embodiments, regions that are distant from the POI and/or are at poor viewing angles may not be included in the visibility map and/or may be eliminated from consideration in operations described herein.

FIG. 4B shows exemplary grid points $g(x_1, y_1)$ 415 and $g(x_2, y_2)$ 425 (which have been exaggerated in FIG. 4A for clarity). FIG. 4A also indicates that point $g(x_1, y_1)$ 415 is separated from POI 310 by distance $dist(g(x, y), POI_{310})$. Further, as shown in FIG. 4A, grid point $g(x_1, y_1)$ lies at an angle α to normal 418 in 2-dimensional visibility map 400. The term "normal" or "normal vector," as used herein, refers to a straight line pointing in a direction perpendicular or orthogonal to, a reference line or vector in a 2-dimensional representation. In 3-dimensional space, the normal may be perpendicular or orthogonal to a reference plane.

In FIGS. 3, 4A and 4B, POIs 310 and 320 may be storefront signs and, in some embodiments, visibility maps 400 and/or 450 may be generated using previously stored information in response to a picture of a storefront taken by an image sensor 180 on the mobile device. For example, if the image of the storefront sign captured by the user of the mobile device shows "ABC BOOKS," then the captured image may be processed to determine that the user is in front of an "ABC BOOKS" store entrance in a mall, which may be in building 227. In some embodiments, a subset of POIs may be identified as a match out of a plurality of POIs in a region by using mobile device captured images of POIs and comparing the mobile device captured images of each POI with stored POI images of the plurality of POIs in the region. For example, mobile device 110 may capture several images of POIs from a location, the mobile device captured POI images may be matched with stored POI images and a subset of POIs may be identified as being shown in the mobile device captured images and therefore visible to mobile device 110.

Various image processing and computer vision techniques such as the Scale Invariant Feature Transform (SIFT) may be used to identify features in a POI image captured by the mobile device and correlate the identified features in the captured image with features in reference images of the POI stored in a database. In some embodiments, the features selected for inclusion in a database may be highly distinctive, to permit individual features to be matched with high probability against a large database of features from many images. Such matching or feature identification may be achieved by mobile device 110, by a server, such as server 250, wirelessly coupled to mobile device 110, or by mobile device 110 in conjunction with one or more servers 250 wirelessly coupled to mobile device 110 and may be performed by some combination of hardware and/or software.

In some embodiments, SIFT may be used to extract distinctive and invariant features from images. These features may be used for robust matching of different views of an object or scene. In SIFT, image features selected for matching may be invariant to image scaling and rotation. SIFT permits robust feature matching across a substantial range of affine distortion, and through noise, changes in 3D viewpoints, and changes in illumination. Affine transformations pertain to image transformations which preserve straight lines, so that all points lying on a line continue to lie on a line after transformation. Affine distortion occurs when a transformation distorts lines in an image so that the collinear points prior to the transformation are skewed to some degree about a line post-transformation. SIFT algorithms are robust and tolerate affine distortion when performing feature matching. In one embodiment, Optical Character Recognition (OCR) may be used to identify the POI and the viewing angle of the image sensor 180 relative to the POI may be estimated based on the distortion of the bounding box of the text or based on the detected vanishing points.

In some embodiments, the last known or most recent GPS position may used as an approximation of the location of mobile device 110 and images of POIs in an area around the last known/most recent GPS location may be searched for images corresponding to the image of POI 310 captured by image sensor 180 on mobile device 110. In some embodiments, the position of mobile device 110 may be further narrowed from the last known/most recent GPS location based on information provided by IMU 170. In some embodiments, mobile device 110 may be able to connect to a WLAN through Access Points (e.g. APs 120-3 and 120-4) within the mall/building 227 and network based positioning methods may be used to calculate an approximate location of mobile device 110. In general, one or more techniques above may be used individually, or combined in a manner consistent with disclosed embodiments, to obtain an initial estimate of the location of mobile device 110. In some embodiments, images associated with an area around the initial estimate of the location of mobile device 110 may be searched to determine a correspondence with one or more image(s) taken by image sensor 180 on mobile device 110.

Accordingly, in one embodiment, an area around the user's last known/determined position may be searched for an image corresponding to POI 310. Once the storefront sign has been identified as "ABC BOOKS", it may be determined that there are two entrances given by POIs 310 and 320 to the "ABC BOOKS" store where the sign may be located. Visibility map 450 may then be generated based on POIs 310 and 320 and regions 410 and 420 may be seen a possible locations of the mobile device 110 and/or the user because POIs 310 and 320 are visible from these regions.

In some embodiments, the position of the user may be further refined based on a likelihood or probability relative to a POI (such as POI 310) that a user is at a specific grid point. In one embodiment, the probability, relative to a POI, that a mobile device is at a specific grid point may be estimated based on an optimal or estimated viewing angle and/or an optimal or estimated distance from which the POI can be seen.

In another embodiment, when location determination based on at least one captured image using computer vision based techniques are applied to images captured by the mobile device 110 and used for pose estimation, then, the probability, relative to a POI, that a mobile device 110 is at a specific grid point may be estimated using the pose estimation and a confidence interval or accuracy associated with the pose estimation. In some embodiments, mobile device pose estimation may be based, in part, on information provided by IMU 170. In some embodiments, pose related information provided by IMU 170 may be used in conjunction with computer vision based techniques. When mobile device pose estimation uses information provided by IMU 170, then the probability, relative to a POI, that a mobile device 110 is at a specific grid point may be estimated using the pose estimation and by adjusting the confidence interval based on the accuracy associated with the IMU/hybrid pose estimation.

In a further embodiment, the probability, relative to a POI, that a mobile device is at a specific grid point may be estimated based on knowledge of previous locations from where people have seen this landmark. For example, a history based on information compiled from various information sources such as third party information sources, which may include images associated with the POI in question may be used to determine a probability relative to the POI that a mobile device is at a specific grid point. For popular attractions, there may be preferred vantage points from which pictures are typically taken, or from which features associated with the POI that may be advantageously viewed. By comparing an image taken by mobile device 110 with the images from one or more third party sources, a probability, relative to a POI, that a mobile device is at a specific grid point may be ascertained. In some embodiments, the images may be available from the Internet, from various picture sharing/social media web sites such as Flickr, Picasa, Facebook etc, from image search engines such as Yahoo, Google, Bing, etc., and/or from a web site associated with the POI.

In some instances, such as where pose estimation for a landmark $POI_j$ is unavailable, and no prior history of locations and images from where people have seen the landmark exists, then, in some embodiments, an individual POI grid point weight $w_{POI_j}^{g(x,y)}$ can be assigned to each point $g(x, y)$ relative to an optimal or estimated viewing angle and/or an optimal or estimated distance for viewing the landmark $POI_j$. In some instances, the optimal viewing angle and/or optimal distance may correspond to the viewing angle and/or distance from which the landmark is viewed best. The optimal viewing angle and/or distance to view the landmark may be determined empirically, though heuristics, or by other estimation techniques. For example: an optimal view of a specific store may be from a distance of about 10 feet from the storefront, and the optimal viewing angle of the store front could be directly facing the store front, i.e. in the normal vector direction from the store front.

Figure 4C:
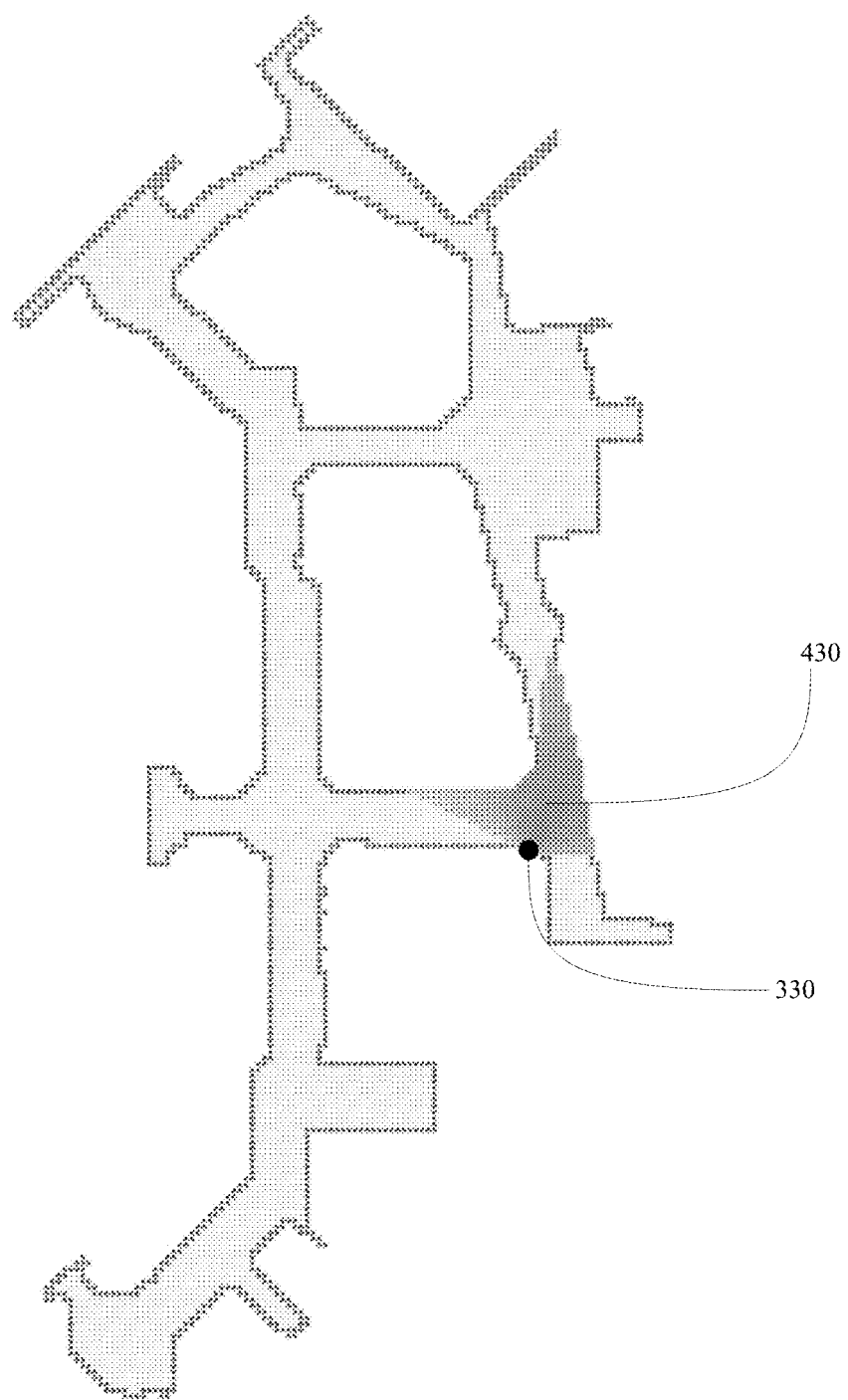
FIG. 4C shows an exemplary visibility map for point of interest (POI) 330.

FIG. 4C shows another exemplary visibility map 470 for POI 330. As shown in FIG. 4C, shaded region 430 is visible to POI 330 (or conversely, POI 330 is visible from region 430). For example, the user may use (or have used) the mobile device to take an image of another storefront sign visible to the user such as POI 330. For example, POI 330 may correspond to storefront sign "PQR SHOES". Once the storefront has been identified as "PQR Shoes", a visibility map 470 may then be obtained based on POI 330 and region 430 may be seen as another possible location of the user because POI 330 is visible from region 430. In some embodiments, visibility map 470 may be a visibility heat map where grid points may be weighted with individual POI grid point weights relative to POI 330. In some embodiments, the VBP application may trigger the capture of additional images to narrow the location of mobile device 110 because of the ambiguity associated with POI 310 (i.e. two store entrances 310 and 320 with the same storefront sign).

Figure 4D:
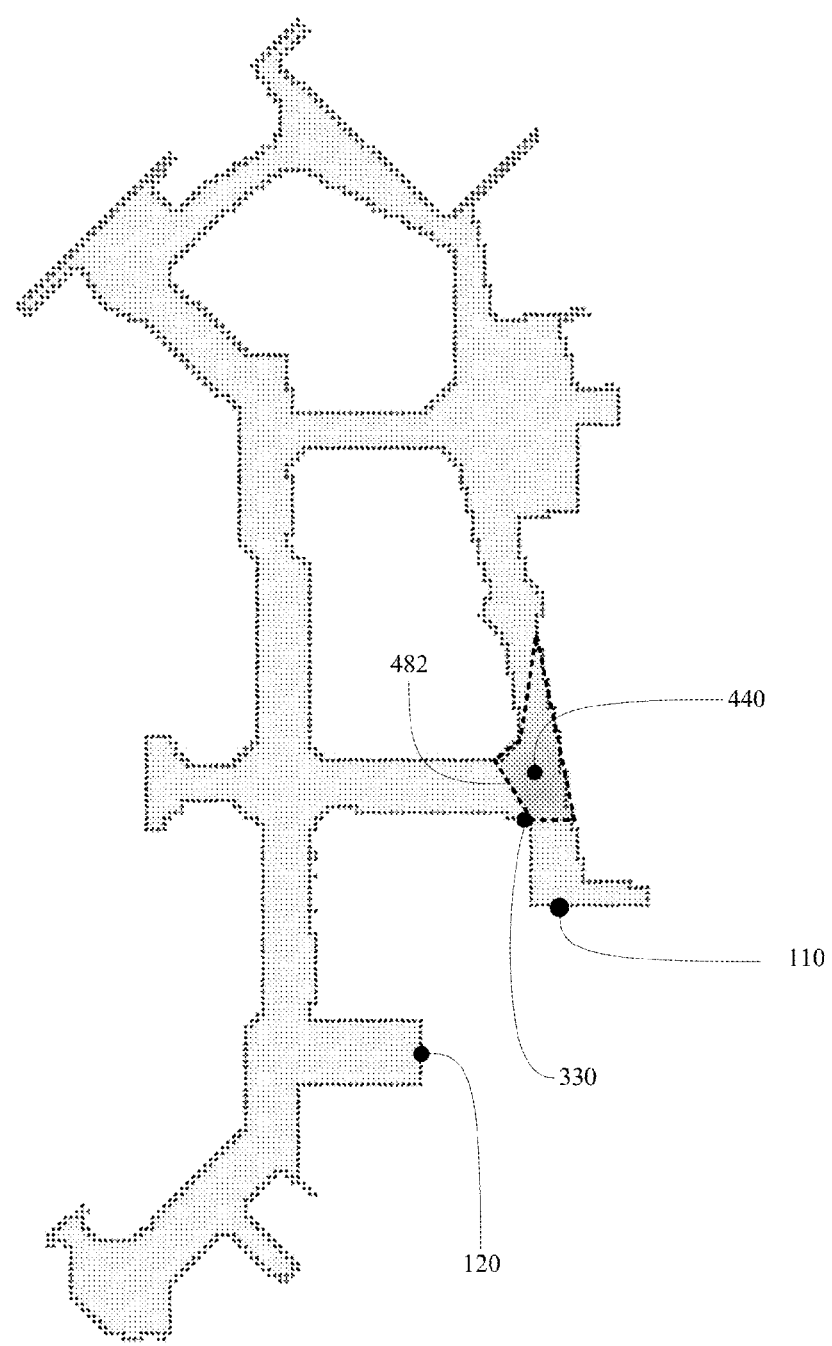
FIG. 4D shows an exemplary visibility map showing an estimated location for the mobile device based on the overlap or intersection between several regions 410, 420 and 430.

FIG. 4D shows an exemplary visibility map 480 showing an estimated location for the mobile device based on the overlap or intersection between regions 410, 420 and 430. For example, visibility map 480 may be obtained from the intersection of regions 410, 420 and 430. In some embodiments, visibility map 480 may be a visibility heat map and showing cumulative grid point probabilities based on POIs 310 and 330. In some embodiments, in visibility map 480, region 482 (shown by the dashed lines) representing the intersection of regions 410 and 430 may be computed as a likely location of the mobile device/user. The term "intersection" as used herein refers to mathematical intersection of two or more sets, with the intersection being given by those elements that are common to all the sets being considered. For example, the intersection of regions 410 and 430 would be all grid points that are present in region 410 and also in region 430. In one embodiment, an algorithm to determine a likely location of mobile device 110 may obtain grid points in visibility map 480 as the intersection of visibility maps 450 and 470. Visibility map 480 shows the intersection, given by region 482, which is the set of likely positions of mobile device 110.

In some embodiments, VBP techniques may obtain a location of mobile device 110 as the centroid of region 482. In some embodiments, the centroid may be based on the cumulative grid point weight of grid points in region 482. For example, an estimate for the location of the mobile device/user relative to a plurality of POIs may be obtained based on a cumulative grid point weight, which represents the probability that a mobile device is at a specific grid point relative to the POIs under consideration. In some embodiments, a cumulative grid point weight may be computed for each grid point in region 482. The cumulative grid point weight may be computed as a function of POI-specific grid point weights associated with a grid point in a visibility map such as visibility map 480.

For example, a cumulative grid point weight $W_{g(xi, yi)}$ for a grid point $g(x_i, y_i)$ on visibility maps may be computed as a function of the set of POI grid point weights $w_j$, where $w_j$ is the POI grid point weight of grid point $g(x_i, y_i)$ relative to corresponding the $j^{th}$ POI $POI_j$. For example, a cumulative grid point weight $W_{g(x_i, y_i)}$ for a grid point $g(x_i, y_i)$ in region 482 in visibility map 480 may be computed based on POI grid point weights $w_j$ relative to POIs 310 and 330.

In general, for a set of M grid points and a subset of N POIs that are visible from a location of MS 110 and given by $POI_0$ through $POI_{N-1}$, the cumulative grid point weight $W_{g(xi, yi)}$ for each grid point $g(x_i, y_i)$ $1 \leq i \leq M$ on a visibility map may be calculated as:

$$W_{g(xi,yi)} = w_0^{g(xi,yi)} * w_1^{g(xi,yi)} * w_2^{g(xi,yi)} * \ldots * w_{N-1}^{g(xi,yi)} \qquad (1)$$

$w_j^{g(xi, yi)}$ is the POI grid point weight of grid point $g(x_i, y_i)$ for corresponding $j^{th}$ POI, $0 \leq j \leq N-1$; and $w_j^{g(xi, yi)} = w\_d_j^{g(xi, yi)} * w\_\alpha_j^{g(xi, yi)}$ where $w\_d_j^{g(xi, yi)}$ and $w\_\alpha_j^{g(xi, yi)}$ are distance and angle based weights, respectively, for $g(x_i, y_i)$ for $POI_j$. For example, for POIs 320 and 330, there are no grid points in region 420 from which POI 330 is visible, and no grid points in region 430 from which POI 310 is visible. Therefore, the cumulative weight of grid points in region 420 relative to POIs 320 and 330 is zero. Conversely, POIs 310 and 330 are visible from all grid points in region 482. Therefore, each grid point in region 482 may have a non-zero cumulative weight relative to POIs 310 and 330.

Accordingly, the cumulative grid point weight for each grid point may be computed as a function of individual POI grid point weights for each POI in the subset of POIs. For example, the function to compute the cumulative grid point weight for each grid point may be a product of the individual POI grid point weights of POI in the subset. In some embodiments, the cumulative grid point weight may be computed for grid points in an area common to the visibility maps of the subset of POIs. Further, in some embodiments, the area common to the visibility maps of the subset of POIs is obtained from an intersection of visibility maps corresponding to the subset of POIs The location of the MS/user may then be estimated as $$loc(X) = \frac{\sum_{i=1}^{M} x_i W_i}{\sum_{i=1}^{M} W_i} \qquad (2A)$$

and $$loc(Y) = \frac{\sum_{i=1}^{M} y_i W_i}{\sum_{i=1}^{M} W_i} \qquad (2B)$$

where $W_i$ is the cumulative grid point weight for grid point $g(x_i, y_i)$ on the visibility map. The estimated location of the MS may be given as (loc(X), loc(Y)). In FIG. 4D, the location of the MS is estimated as the grid point 440.

Figure 5A:
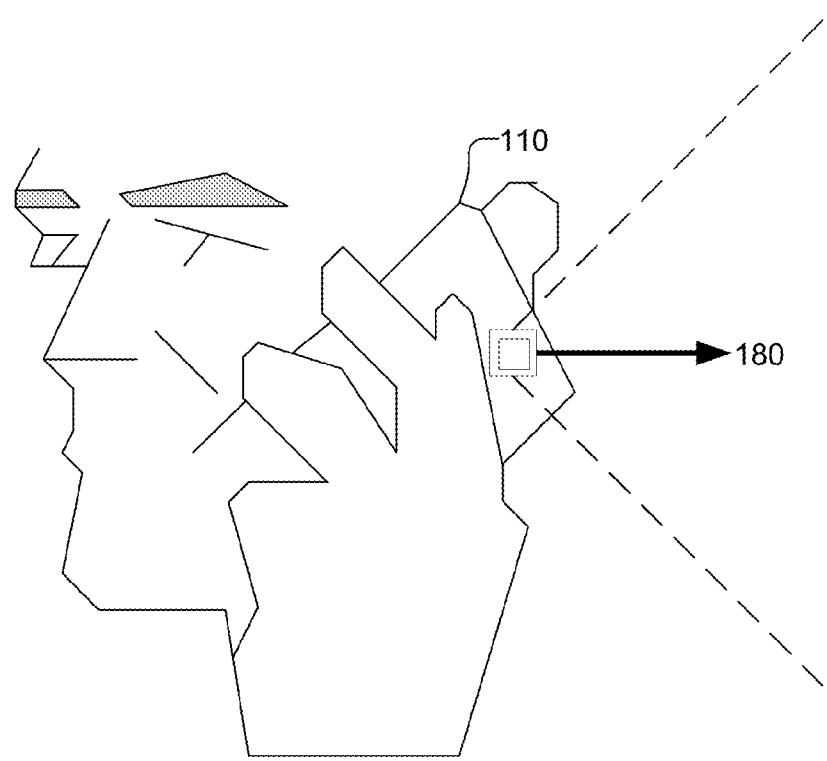
FIG. 5A shows a user with a mobile device, showing an instance where location determination may be triggered based on one or more images captured by the mobile device.

FIG. 5A shows a user with a mobile device, showing an instance where location determination may be triggered based on one or more images captured by the mobile device. For example, VBP may be triggered. In some embodiments, when a user makes a call with mobile device 110 to one or more specified device identifiers and/or satisfies some other criteria one or more images or a video sequence by image sensor 180 may be captured and location determination may be initiated based on the captured images/video sequence. The term device identifier is used to refer to phone numbers and/or other identifying information by which a device may be addressed. For example, a user may invoke an application on mobile device 100, which may use an alternate device identifier such as a user id, Internet Protocol (IP) address, etc. to initiate aural communication with another device.

Based on the device identifier and/or satisfaction of some other criteria, a VBP application on mobile device 110 may be invoked and one or more images by image sensor 180 may be captured. For example, during a phone call or other aural communication, mobile device 110 may be held against the ear, with the rear image sensor facing away and typically having a wide view angle or wide field of view. Thus, based in part on the field of view, in some embodiments, during communication with specified device identifiers such as during an emergency (911) call, location determination may be initiated based on at least one image captured by image sensor 180. In some embodiments, a VBP application may be automatically triggered, one or more pictures or a video sequence by image sensor 180 may be captured, and the pictures/video sequence may be used to determine a location of mobile device 110 using VBP techniques consistent with embodiments described herein. In some embodiments, a VBP application may be triggered when the call to the specified device identifiers (such as a phone number) is placed and/or a call from one of the specified device identifiers is received. In some embodiments, the VBP application may be triggered based on input from a proximity sensor. For example, in a situation where a young child is lost, or a person is disoriented, when the child or person calls (or is called by) parents or guardians, one or more pictures or a video sequence by image sensor 180 may be captured, and the pictures/video sequence may be used to determine a location of mobile device 110. The pictures/video sequence may also be transmitted to the device in communication with mobile device 110 and/or to a location server or other position determination entity.

Figure 5B:
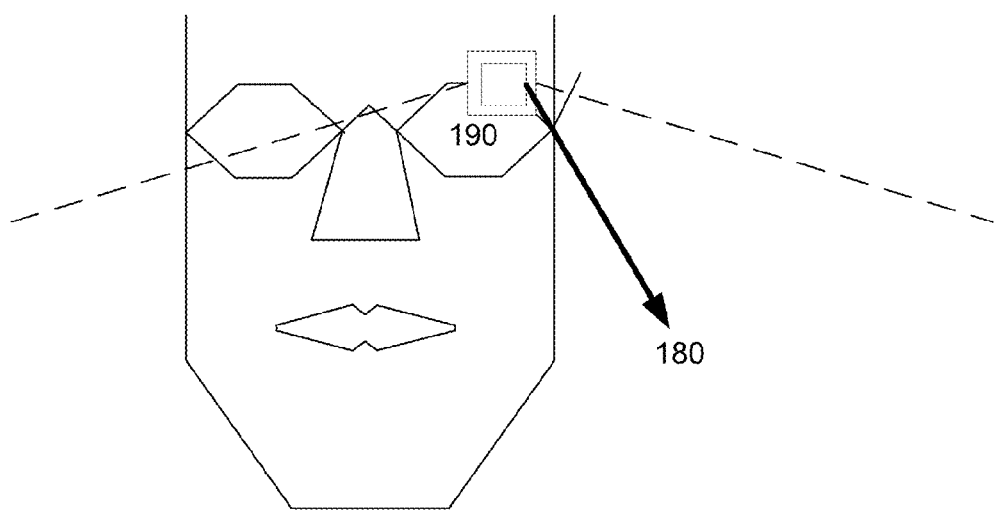
FIG. 5B shows a user with a mobile device, showing an instance where location determination may be triggered based on one or more images captured by the mobile device.

FIG. 5B shows a user with wearable mobile device 110, showing an instance where location determination may be triggered based on one or more images captured by the mobile device. In FIG. 5B, display 190 and image sensor 180 may be coupled to eyewear, which may also include some or all of mobile device 110. In embodiments, where mobile device 110 and/or image sensor 180 is wearable, location determination based on at least one captured image or VBP techniques may be triggered during calls (placed or received) with specified device identifiers. For example, in some embodiments, one or more of the configuration settings, and/or make/model number of mobile device 110, and/or the operating system and/or an application programming interface (API), application or image sensor 180 may be queried to determine that image sensor 180 is generally available with a wide field of view. In embodiments, where the image sensor is generally available with an adequate or wide field of view, the VBP application may be triggered based on any specified criteria without regard to input from a proximity sensor (if any are present in mobile device 110). For example, as shown in FIGS. 5A and 5B by the dashed lines, image sensor 180 has a large field of view in both instances.

Figure 5C:
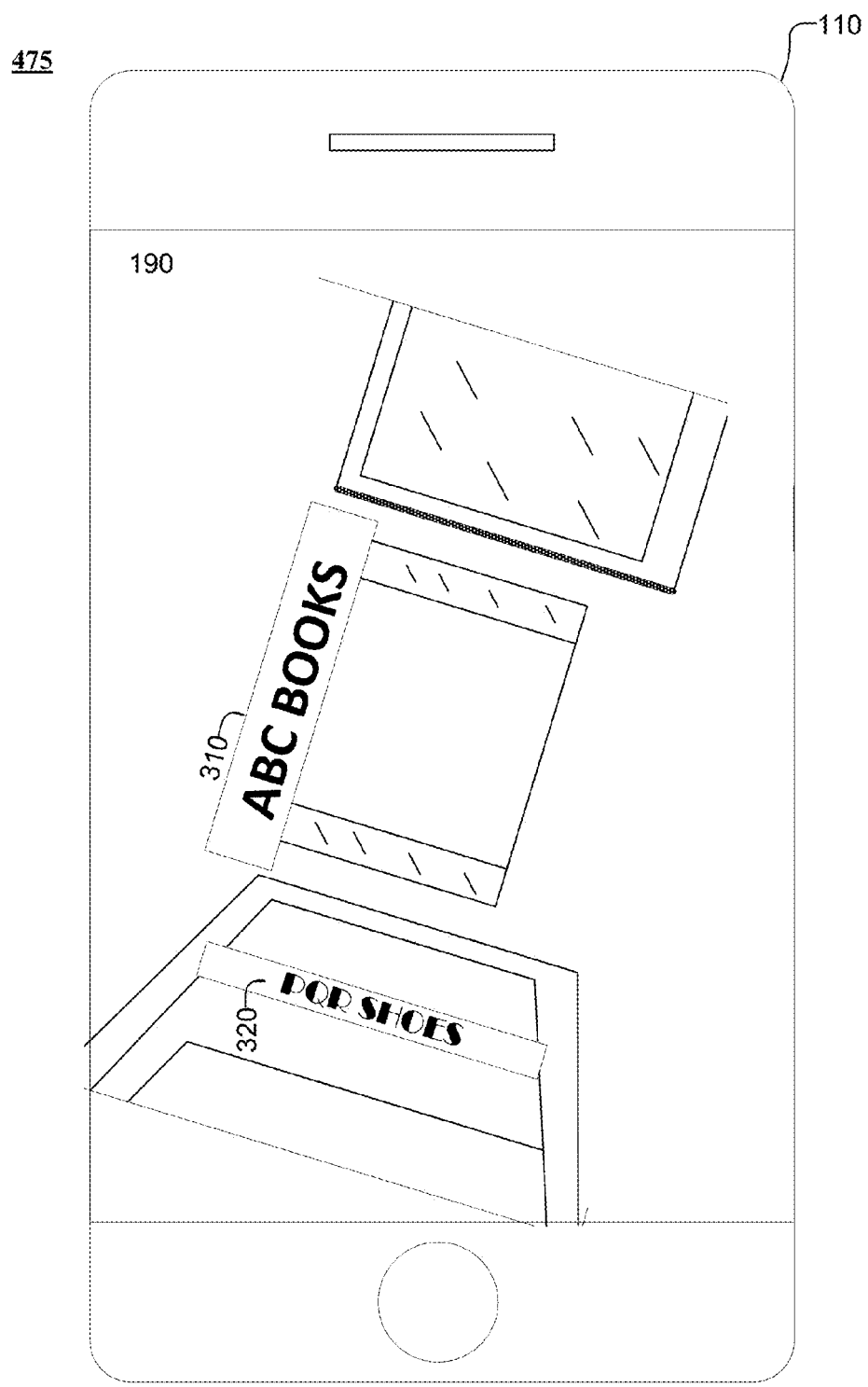
FIG. 5C shows an exemplary image captured by an image sensor on a mobile device capable of being used to determine a location of the mobile device.

FIG. 5C shows an exemplary image 475 captured by an image sensor 180 on mobile device 110 displayed on display 190, where the image may be used to determine a location of mobile device 110. In some embodiments, image 475 may be used in a VBP method. As shown in FIG. 5C, image 475 captured by image sensor 180 shows POIs 310 and 330, which may be used by an image based location determination method and/or a VBP application to determine a location of mobile device 110 in a manner consistent with disclosed embodiments.

Figure 6A:
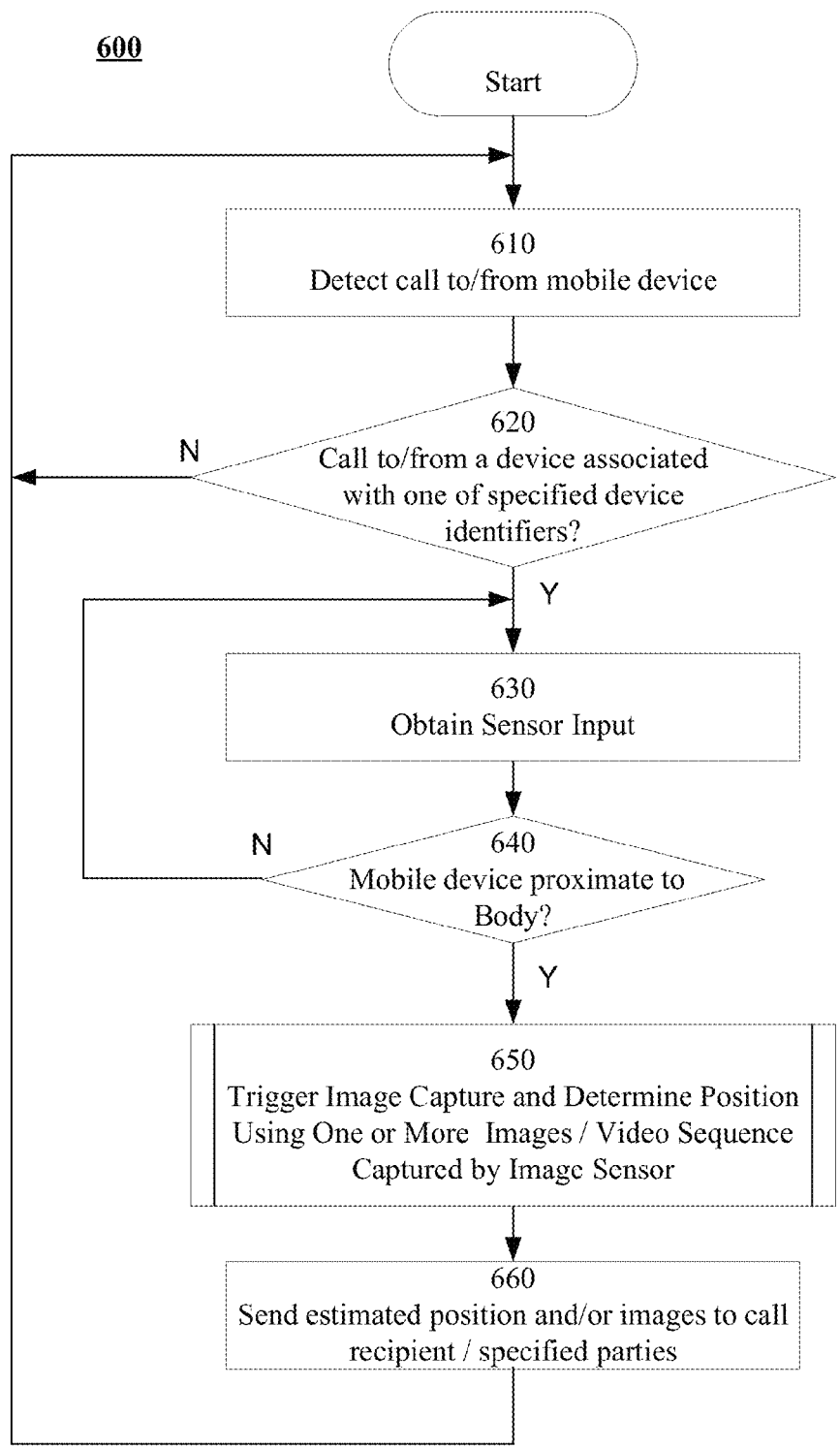
FIG. 6A shows a flowchart of an exemplary method for automatically triggering location determination based on at least one captured image in a manner consistent with disclosed embodiments.

FIG. 6A shows a flowchart of an exemplary method 600 for automatically triggering location determination based on at least one captured image in a manner consistent with disclosed embodiments. In some embodiments, method 600 may be performed by a processor or processor(s) 150 in mobile device 110.

In step 610, a call or communication to or from mobile device 110 from a device associated with a device identifier may be detected. In step 520, it may be determined whether the called or calling device identifier (e.g. a phone number) is one of a specified set of previously designated device identifiers. If the called or calling device identifier is one of a specified set of previously designated device identifiers ("Y" in step 620), then, sensor input may be obtained in step 630. If the called or calling device identifier is not one of a specified set of previously designated device identifiers ("N" in step 620), then, the next communication may be awaited in step 610.

In some embodiments, steps 630 and 640 may be optionally executed. In step 630, sensor input may optionally be obtained. For example, sensor input may be obtained by processor(s) 150 from proximity sensor/sensor bank 185. In some embodiments, steps 630 and 640 may be omitted (or not invoked or not executed). For example, in embodiments where the configuration settings or other parameters may be used to infer or predict that a clear picture from image sensor 180 on mobile device 110 is normally available, then, steps 630 and 640 may be omitted without regard to input from any proximity sensor on mobile device 110.

In step 640, if the input from proximity sensor/sensor bank 185 indicates that mobile device 110 (and/or a portion of mobile device 110) is not proximate to nor in contact with the user's body, ("N" in step 640), then, another iteration is begun in step 630, where new sensor readings may be obtained.

In step 640, if the input from proximity sensor/sensor bank 185 indicates that mobile device 110 (and/or a portion of mobile device 110) is proximate to and/or in contact with the user's body, ("Y" in step 640), (or if configuration settings indicate image sensor field of view availability) then, in step 650, the capture of one or more images/video images by image sensor 180 may be triggered, and a position of mobile device 110 may be determined based on the one or more images captured by image sensor 180. The input from proximity sensors and/or configuration settings may be used to determine the available or likely field of view for image sensor 180. As shown in FIG. 5A by the dashed lines, rear-facing image sensor 180 typically has a large field of view when the phone is held against the ear. Similarly, as shown in FIG. 5B, a wearable mobile device 110, may have an image sensor 180 whose field of view is typically wide.

For example, any known VBP technique may be used in conjunction with method 600. For example, one or more techniques disclosed in the following co-pending commonly assigned U.S. patent application Ser. No. 13/794,316 entitled "Methods and Apparatus for Position Estimation"; Ser. No. 13/486,359 entitled "Logo Detection for Indoor Positioning"; and Ser. No. 13/829,099 entitled "Pose Estimation Based on Peripheral Information" may be used during VBP to obtain an estimated position of mobile device 110. The above-identified applications are all hereby incorporated by reference in their entireties herein.

In some embodiments, input from other sensors such as the ambient light sensor, battery indicator, available memory etc may be used to determine whether to trigger the flash and/or to determine the number and/or frequency and/or resolution of captured images.

In step 660, the estimated position of mobile device 110, as determined by the VBP technique in step 650 is sent to one or more specified parties. In some embodiments, one or more of the images captured during VBP may be sent along the estimated position of mobile device 110. In some embodiments, the images may be compressed prior to transmission, the resolution of images captured by image sensor 180 may be adjusted, and/or a subset of the number of images captured may be transmitted based on the available bandwidth, signal strength, and/or a specified protocol used for communication and/or user configuration settings. For example, image compression may be increased and/or lower resolution images captured and/or a lower number of images transmitted if the available bandwidth is lower. In another embodiment, one or more of the resolution of images, compression scheme, nature of images (e.g. still or video), number of images transmitted, may be adjusted or specified based on some agreed upon communication protocol, user configuration settings and/or based upon input from an image based location determination application or VBP application.

Figure 6B:
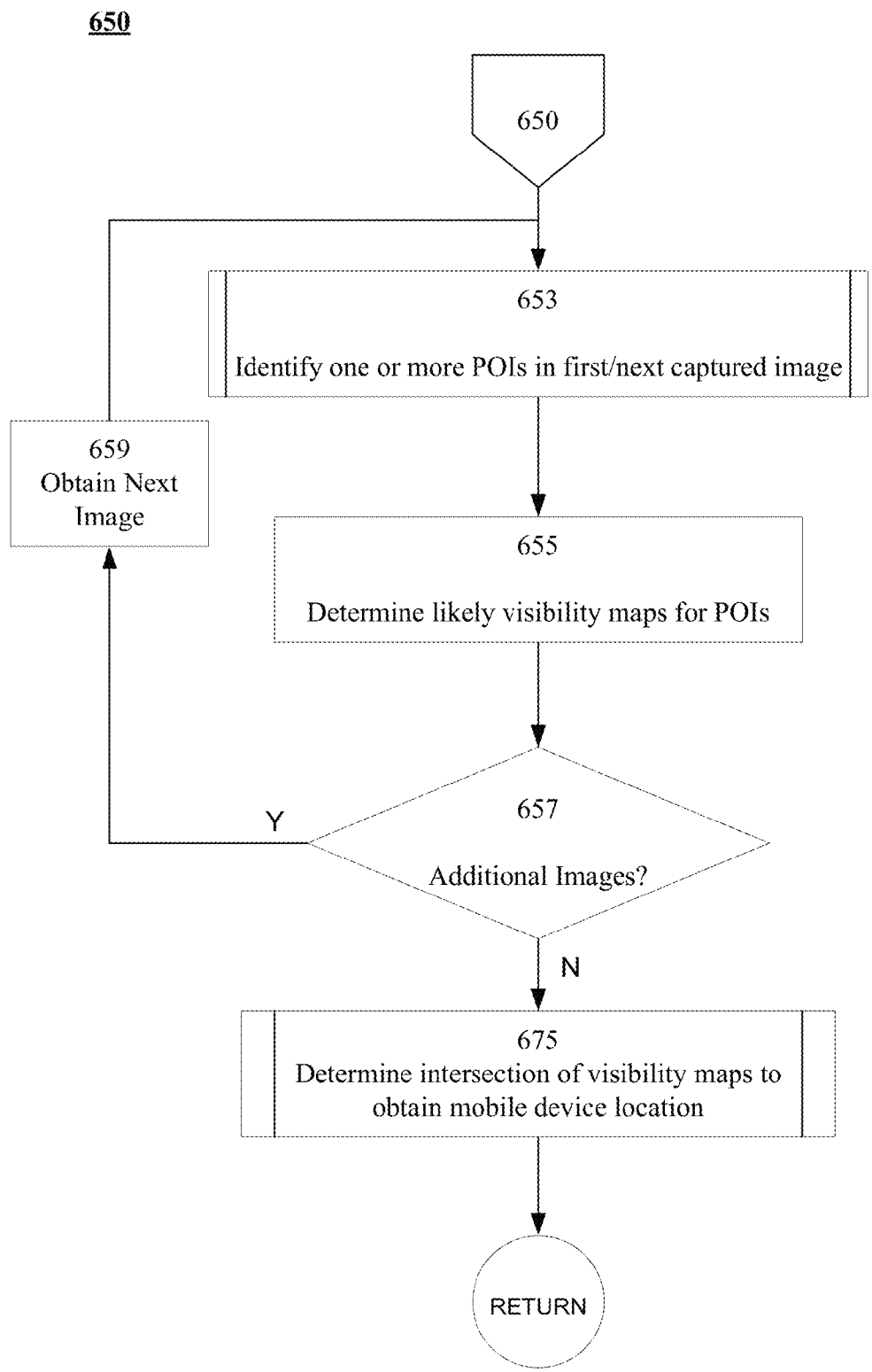
FIG. 6B shows a flowchart of an exemplary method for location determination based on at least one captured image consistent with disclosed embodiments.

FIG. 6B shows a flowchart of an exemplary method 650 for location determination based on at least one captured image consistent with disclosed embodiments. In some embodiments, method 650 may be performed by mobile device 110 and/or a server (e.g. server 250) wirelessly coupled to mobile device 110, or may be distributed between mobile device 110 and the server.

In routine 653, one or more POIs may be identified in an image captured by mobile device 110. In some embodiments, the last known/most recent location of mobile device 110 may be used to obtain an initial estimate or approximation of the location of mobile device 110 and the image captured by mobile device 110 may be matched with images of POIs in a region around the initial estimate. In some embodiments, a subset of POIs may be identified from a plurality of POIs in a POI database by matching mobile device captured images of each POI in the subset with a corresponding stored POI images. For example, the stored POI images may be matched to corresponding mobile device captured images based, in part, on Scale Invariant Feature Transform (SIFT) techniques.

Next, in step 655, visibility maps corresponding to the one or more POI(s) identified in step 653 may be generated. For example, the visibility map may be generated using a plurality of vectors representing lines of emanating from the POI and ending at opaque barriers on the map, and/or at a predefined distance threshold (which may be specified by maxRange). In some embodiments, the plurality of vectors may further be limited by an angular threshold from a normal vector (which may be specified by maxAngle). By integrating over the plurality of vectors, a visibility region representative of the visibility map may be calculated. In some embodiments, a visibility maps for POIs may be generated in advance, stored and made available as part of a map and/or POI database.

In step 657, the algorithm may determine if additional images are present or may be requested. For example, if there is ambiguity related to the POIs (e.g. two POIs 310 and 320 associated with the "ABC BOOKSTORE" storefront), additional images may be requested and/or obtained and processed. If there are additional images to be processed ("Y" in step 657), then, in step 659, the next image may be selected and another iteration is begun in step 653.

If there are no more images ("N" in step 657), then, in some embodiments, an intersection of visibility maps may be computed in routine 675. In some embodiments, the computation of the intersection of visibility maps may yield a set of grid points that define a region, which may be used as an estimate of the location of mobile device 110. In some embodiments, algorithm 650 may terminate and invoke additional VBP methods to further refine or narrow the estimated location of mobile device 110. For example, the centroid of the region obtained by the intersection of visibility maps may be used to narrow the position of mobile device 110. In some embodiments, the centroid may be computed based on individual POI grid point weights $w_j^{g(x, y)}$ assigned to each point g(x, y) relative to an optimal or estimated viewing angle and/or an optimal or estimated distance for viewing the landmark $POI_j$.

Figure 6C:
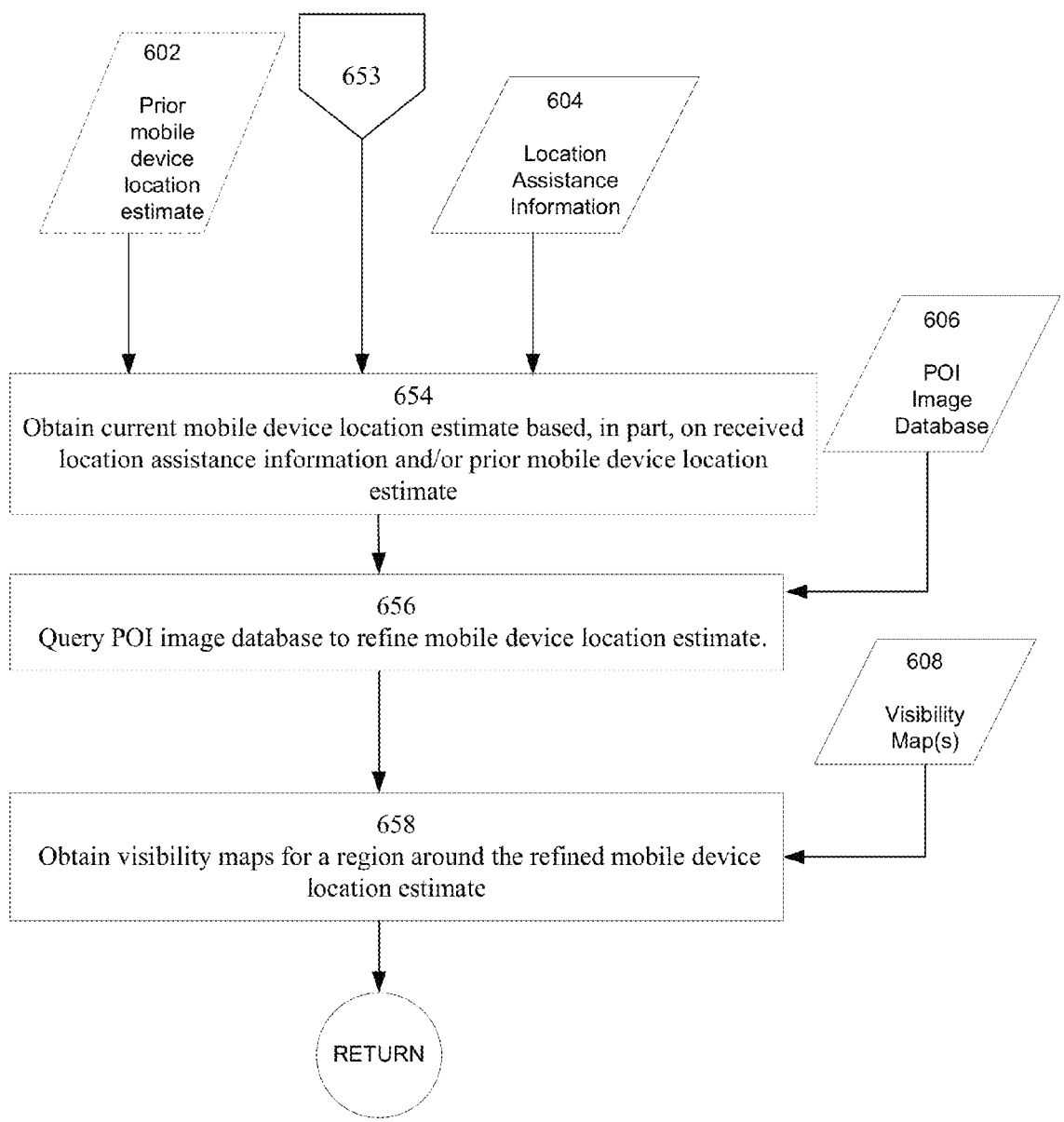
FIG. 6C shows a flowchart of an exemplary method, consistent with disclosed embodiments, for identifying at least one point of interest in an image captured during an image based location determination process.

FIG. 6C shows a flowchart of an exemplary routine 653, consistent with disclosed embodiments, for identifying at least one POI in an image captured during an image based location determination process.

In some embodiments, in step 654, a current mobile device location estimate may be obtained based, in part, on received location assistance information 604. In some embodiments, for example, if location assistance information is unavailable, POI image database 606 may be queried based, in part, on a prior or most recent mobile device location estimate 602. In some embodiments, the prior or most recent mobile device location estimate 602 may be based on the last known location of mobile device 110, which, in some instances, may be augmented using input from IMU 170. In some embodiments, location assistance information 604 may be used in conjunction with prior or most recent mobile device location estimate 602 to obtain an estimated position of mobile device 110. In step 656, In step 656, in some embodiments, the current mobile device location estimate obtained in step 654, may then be used along with one or more captured images to query POI image database 606. The captured image may be compared with stored images and a refined estimate of the location of mobile device 110 may be obtained in step 656. For example, various image processing and computer vision techniques using image descriptors such as SIFT, SURF, etc. may be used to identify features in a POI image captured by image sensor 180 and correlate the identified features in the captured image with features in reference images of the POI stored in a database. The correlated features may be used in conjunction with mobile device location estimate from step 654, to obtain a refined location of mobile device 110.

In step 658, the refined location estimate may be used to obtain one or more visibility maps corresponding to a region around the refined location estimate. For example, visibility maps for regions 410 and 420 may be obtained.

Figure 6D:
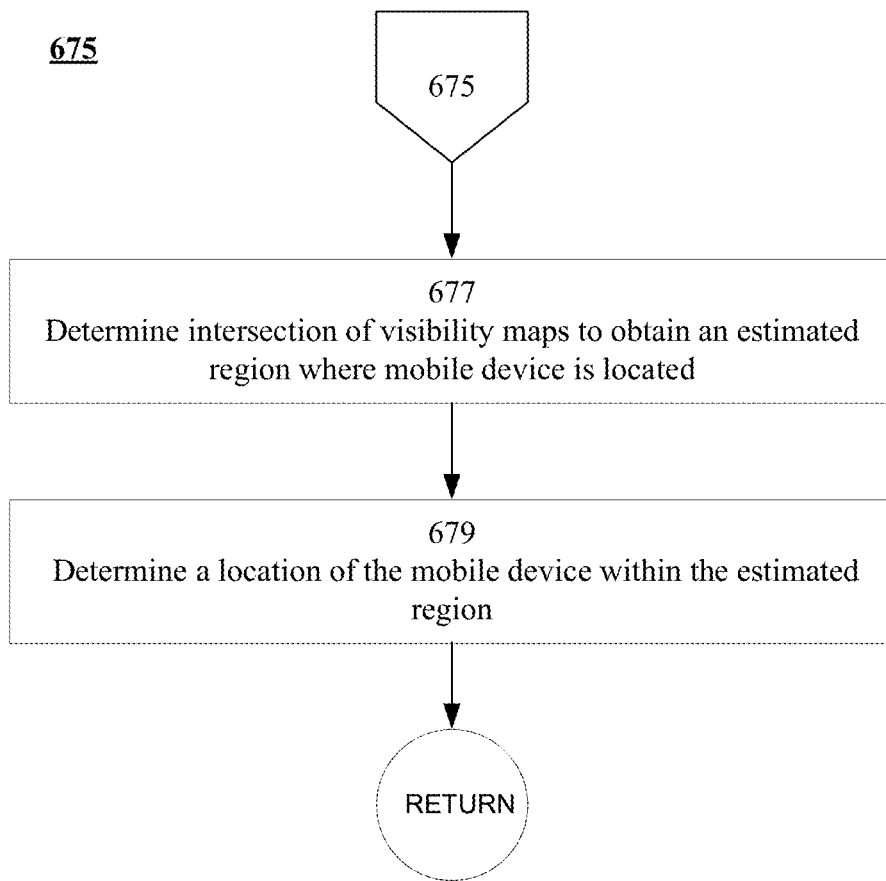
FIG. 6D shows a flowchart of an exemplary method, consistent with disclosed embodiments, for determining an intersection of visibility maps to obtain a mobile device location based on at least one captured image.

FIG. 6D shows a flowchart of an exemplary method 675, consistent with disclosed embodiments, for determining an intersection of visibility maps to obtain a mobile device location based on at least one captured image.

In step 677, the intersection of visibility maps associated with POIs identified in the captured image may be determined. For example, as shown in FIG. 4D, exemplary visibility map 480 may be obtained based on the overlap or intersection between regions 410, 420 and 430. Visibility map 480 shows the intersection, given by region 482, which is the set of likely positions of mobile device 110.

In step 679, in some embodiments, VBP techniques may obtain a location of mobile device 110 as the centroid of region 482. In some embodiments, the centroid may be based on the cumulative grid point weight of grid points in region 482. For example, an estimate for the location of the mobile device/user relative to a plurality of POIs may be obtained based on a cumulative grid point weight, which represents the probability that a mobile device is at a specific grid point relative to the POIs under consideration. In some embodiments, a cumulative grid point weight may be computed for each grid point in region 482. The cumulative grid point weight may be computed as a function of POI-specific grid point weights associated with a grid point in a visibility map such as visibility map 480. In some embodiments, the cumulative grid point weight and an estimated location of mobile device 110 may be obtained using equations (1) and (2A)-(2B) above.

Figure 7:
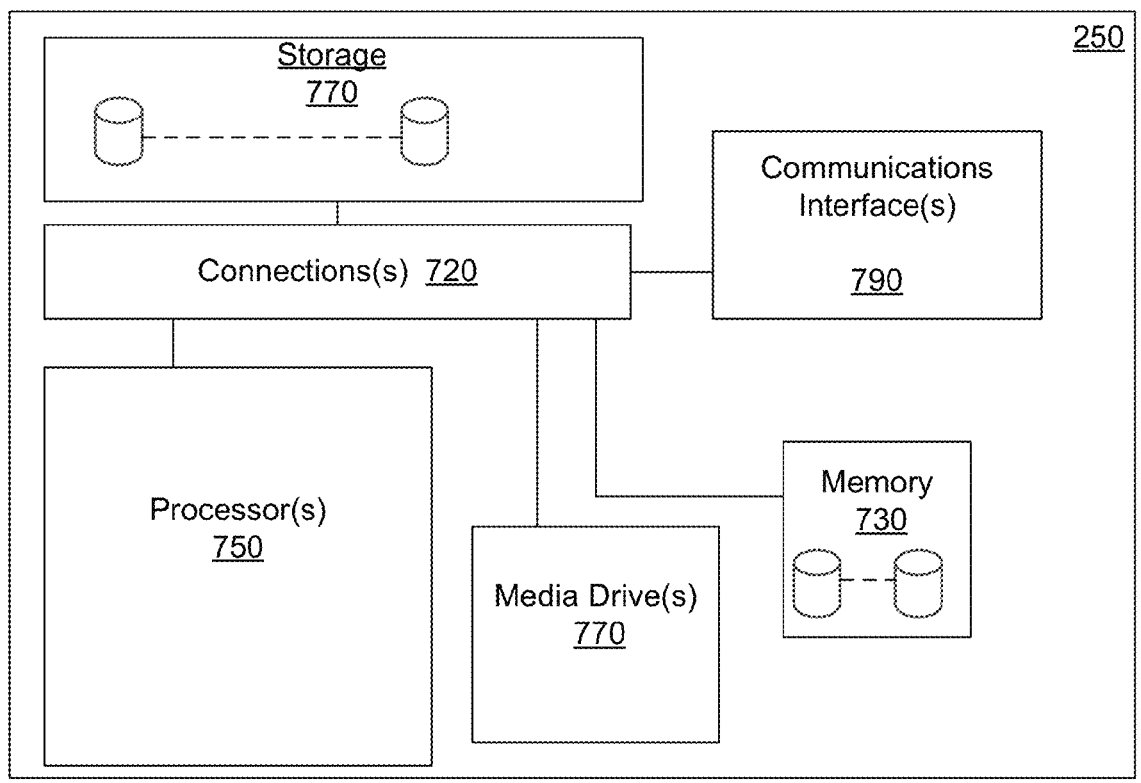
FIG. 7 shows a schematic block diagram illustrating exemplary server enabled to perform robust position estimation using location determination based on at least one captured image in a manner consistent with disclosed embodiments.

FIG. 7 shows a schematic block diagram illustrating exemplary server 250 enabled to perform robust position estimation using VBP techniques in a manner consistent with disclosed embodiments. In some embodiments, server 250 may be wirelessly coupled to one or more mobile devices 110 over a wireless network, which may one of a WWAN, WLAN or WPAN. In some embodiments, server 250 may include, for example, one or more processor(s) 750, memory 730, storage 760, and (as applicable) communications interfaces 790 (e.g., wireline and/or wireless network interfaces). The functional units listed above as well as other functional units may be operatively coupled with one or more connections 720 (e.g., buses, lines, fibers, links, etc.). In certain example implementations, some portion of server 250 may take the form of a chipset, and/or the like.

Communications interfaces 790 may include a variety of wired and/or wireless connections that support wired transmission and/or reception and, if desired, may additionally or alternatively support transmission and reception of one or more signals over one or more types of wireless communication networks. Communications interfaces 790 may also include interfaces for communication with various other computers and peripherals. For example, in one embodiment, Communications interfaces 790 may comprise network interface cards, input-output cards, chips and/or ASICs that implement one or more of the communication functions performed by server 250. Further, server 250 may receive mobile device related information including estimates of the location of mobile device 110 such as the last known/most recent location, requests for location assistance, images of POIs captured by mobile device 110, etc. and/or may also retrieve POI related information from websites through communications interfaces 790. For example, in some embodiments, communications interface(s) 790 may be configured to receive the captured images of each POI in the subset from a mobile device. In some embodiments, server 250 may use communications interface 790 to send POI related information, including POI databases, location assistance information, position estimates etc. to mobile device 110. In general, communications interfaces 790 may be used to send and receive data, control, management, and configuration information to one or more mobile devices.

Processor(s) 750 may be implemented using a combination of hardware, firmware, and software. In some embodiments, processor(s) 750 may be capable of determining a location of a mobile device 110 based, in part, on at least one captured image and may include a VBP determination module and/or a location assistance module (not shown) to facilitate location determination of mobile device 110, and/or to provide location assistance information, respectively. For example, in one embodiment, if image based location determination is being performed by mobile device 110 or another network entity, server 250 may provide POI related information, including POI databases, as location assistance information. In one embodiment, server 250 may use VBP determination module to implement some portion of methods 485 and/or 500. In some embodiments, the functionality in exemplary methods 485 and 500 may be combined in to a single module. Processor(s) 750 may also be capable of processing various other types of information such as performing image processing using SIFT, SURF, etc., or other image matching algorithms to match POIs in images captured by mobile device 110 with images of POIs stored on server 250, either directly or in conjunction with one or more other functional blocks shown in FIG. 7. In some embodiments, processor(s) 750 may represent one or more circuits configurable to perform at least a portion of a data signal computing procedure or process related to the operation of server 250.

The methodologies described herein in flow charts and message flows may be implemented by various means depending upon the application. For example, these methodologies may be implemented in hardware, firmware, software, or any combination thereof. For a hardware implementation, the processor(s) 750 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software may be stored in media drive 770, which may support the use of non-transitory computer-readable media, including removable media. Program code may be resident on non-transitory computer readable media or memory 530 and may be read and executed by processor unit(s) 750. Memory may be implemented within processor(s) 750 or external to processor(s) 750. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium and/or memory 730. Examples include computer-readable media encoded with a data structure and computer-readable media encoded with a computer program. For example, non-transitory computer-readable medium including program code stored thereon may include program code to support robust position estimation using VBP and/or to provide location assistance to mobile device 110 in a manner consistent with disclosed embodiments.

Non-transitory computer-readable media includes a variety of physical computer storage media. A storage medium may be any available medium that can be accessed by a computer. By way of example, and not limitation, such non-transitory computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interfaces 790, which may store the instructions/data in memory 730, storage 760 and/or relay the instructions/data to processor(s) 750 for execution. For example, communications interfaces 790 may receive wireless or network signals indicative of instructions and data. The instructions and data may cause one or more processor(s) 750 to be configured to implement one or more functions outlined in the claims. That is, the communication apparatus includes transmission media with signals indicative of information to perform disclosed functions.

Memory 730 may represent any data storage mechanism. Memory 730 may include, for example, a primary memory and/or a secondary memory. Primary memory may include, for example, a random access memory, read only memory, nonvolatile RAM, etc. While illustrated in this example as being separate from processor(s) 750, it should be understood that all or part of a primary memory may be provided within or otherwise co-located/coupled with processor(s) 750. Secondary memory may include, for example, the same or similar type of memory as primary memory and/or storage 760 such as one or more data storage devices or systems 760 including, for example, hard disk drives, optical disc drives, tape drives, a solid state memory drive, etc. In some embodiments, storage 760 and/or memory 730 may comprise one or more databases that may hold information pertaining to various POI entities for locations served by server 250. In some embodiments, POI related information may include images of the POIs, locations of the POIs, POI features for SIFT or other image matching algorithms, visibility maps for the POIs, etc. In some embodiments, information in the databases may be read, used and/or updated by processor(s) 750 during various computations, including methods for robust VBP mobile device position estimation, for generating location assistance data, and/or for computing estimated locations of mobile devices 110, etc.

In certain implementations, secondary memory may be operatively receptive of, or otherwise configurable to couple to a non-transitory computer-readable medium in media drive 770. As such, in certain example implementations, the methods and/or apparatuses presented herein may take the form in whole or part of a media drive 770 that may include non-transitory computer readable medium with computer implementable instructions stored thereon, which if executed by processor(s) 750 may be operatively enabled to perform all or portions of the example operations as described herein.

Figure 8:
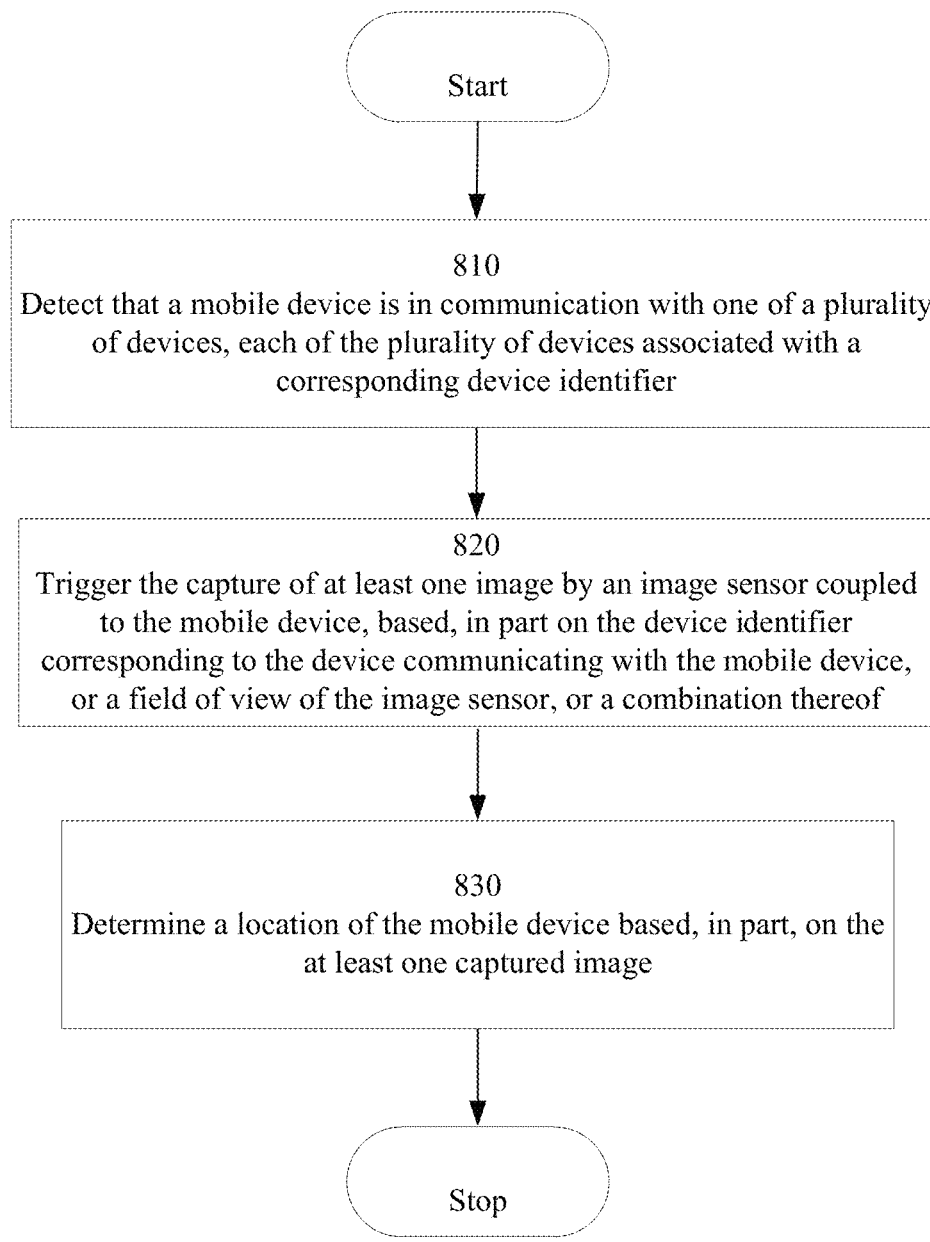
FIG. 8 shows a flowchart of an exemplary method for automatically triggering location determination based on at least one captured image in a manner consistent with disclosed embodiments.

FIG. 8 shows a flowchart of an exemplary method 800 for automatically triggering location determination based on at least one captured image in a manner consistent with disclosed embodiments.

In some embodiments, portions of method 800 may be performed by mobile device 110 and/or server 250. In some embodiments, processor(s) 150 and/or 750 may perform portions of method 800.

In some embodiments, in step 810, a communication between the mobile device and at least one of a plurality of devices, where each of the plurality of devices is associated with a corresponding device identifier, may be detected. For example, the device identifier may take the form of a phone number.

Next, in step 820, the capture of at least one image by an image sensor coupled to the mobile device may be triggered based, in part on: the device identifier corresponding to the device, or a field of view of the image sensor or some combination thereof. In some embodiments, the prediction of the camera's field of view may be based, in part, on input from a proximity sensor on the mobile device indicating that a section of the mobile device is within a threshold proximity of a user of the mobile device. In some embodiments, the prediction of image sensor field of view may be based, in part, on input from a proximity sensor on the mobile device indicating that a section of the mobile device is in contact with a user of the mobile device. In some embodiments, the prediction of image sensor field of view may be based, in part, on a configuration of the mobile device indicating that a field of view is available for the image sensor. In some embodiments, the capture of the at least one image may be triggered using a rear facing image sensor, which may, in some instance, be capable of capturing video images.

In step 830, a location of the mobile device may be determined based, in part, on the at least one captured image. For example, VBP for the mobile device may be initiated, based, in part, on the at least one captured image. In some embodiments, a location of the mobile device may be determined based, at least in part, on the output of the VBP. In some embodiments, the determined location of the mobile device may be transmitted to a device associated with the at least one device identifier and in communication with the mobile device. In some embodiments, one or more of the captured images, which may include video images, may also be transmitted to the device associated with the at least one device identifier and in communication with the mobile device.

In some embodiments, VBP may comprise: identifying, in the at least one captured image, a subset of Points of Interest (POIs) in a plurality of POIs, the subset of POIs being identified by comparing the at least one captured image with stored POI images, wherein each POI in the subset is associated with a corresponding visibility map; and determining an estimated location of the mobile device based, at least in part, on an intersection of visibility maps corresponding to each POI in the subset.

What is claimed is:

1. A method for estimating a position of a mobile device, the method comprising:
   detecting that the mobile device is in communication with one of a plurality of devices, each of the plurality of devices associated with a corresponding device identifier;
   triggering, by the mobile device, a capture of at least one image by an image sensor coupled to the mobile device, based, in part, on:
      a device identifier corresponding to the device communicating with the mobile device, and
      a field of view of the image sensor as determined based on input from a proximity sensor on the mobile device indicating that a section of the mobile device is within a threshold proximity of a user of the mobile device; and
   determining a location of the mobile device based, in part, on the at least one captured image.

2. The method of claim 1, wherein the field of view of the image sensor is determined based further on a configuration of the mobile device indicating that the field of view is available for the image sensor.

3. The method of claim 1, wherein the image sensor is rear facing and/or capable of capturing video images.

4. The method of claim 1 further comprising:
   transmitting the determined location of the mobile device to the device communicating with the mobile device.

5. The method of claim 4 further comprising:
   transmitting the at least one captured image to the device communicating with the mobile device.

6. The method of claim 1, wherein determining the location of the mobile device comprises:
   identifying, in the at least one captured image, a subset of Points of Interest (POIs) in a plurality of POIs, the subset of POIs being identified by comparing the at least one captured image with stored images of the POIs, wherein each POI in the subset is associated with a corresponding visibility map; and
   determining the location of the mobile device based, at least in part, on an intersection of visibility maps corresponding to each POI in the subset.

7. The method of claim 1, wherein the at least one captured image forms part of a video image stream captured by the image sensor.

8. The method of claim 1, wherein the device identifier corresponding to the device is a phone number.

9. A method for estimating a position of a mobile device, the method comprising:
   detecting that the mobile device is in communication with one of a plurality of devices, each of the plurality of devices associated with a corresponding device identifier;
   triggering, by the mobile device, a capture of at least one image by an image sensor coupled to the mobile device, based, in part, on:
      a device identifier corresponding to the device communicating with the mobile device, and
      a field of view of the image sensor as determined based on input from a proximity sensor on the mobile device, wherein the input from the proximity sensor indicates that a section of the mobile device is in contact with a user of the mobile device; and
   determining a location of the mobile device based, in part, on the at least one captured image.

10. A mobile device comprising:
    a memory;
    an image sensor;
    a proximity sensor, and
    a processor coupled to the image sensor, the proximity sensor, and the memory, wherein the processor is configured to:
       detect that the mobile device is in communication with one of a plurality of devices, each device in the plurality of devices associated with a corresponding device identifier;
       trigger, by the processor, a capture of at least one image by the image sensor based, in part, on:
          a device identifier corresponding to the device communicating with the mobile device, and
          a field of view of the image sensor as determined by the processor based on input from the proximity sensor indicating that a section of the mobile device is within a threshold proximity of a user of the mobile device; and
       determine a location of the mobile device based, in part, on the at least one captured image.

11. The mobile device of claim 10, wherein:
the memory comprises configuration settings indicating that the field of view is available for the image sensor, and
wherein the processor is configured to:
determine the field of view of the image sensor based further on the configuration settings in the memory.

12. The mobile device of claim 10, wherein the image sensor is rear facing and/or capable of capturing video images.

13. The mobile device of claim 10, wherein the processor is further configured to:
transmit the determined location of the mobile device to the device communicating with the mobile device.

14. The mobile device of claim 10 wherein the processor is further configured to:
transmit the at least one captured image to the device communicating with the mobile device.

15. The mobile device of claim 10, wherein to determine the location of the mobile device, the processor is configured to:
identify, in the at least one captured image, a subset of Points of Interest (POIs) in a plurality of POIs, the subset of POIs being identified by comparing the at least one captured image with obtained images of the POIs, wherein each POI in the subset is associated with a corresponding visibility map; and
determine the location of the mobile device based, at least in part, on an intersection of visibility maps corresponding to each POI in the subset.

16. The mobile device of claim 10, wherein the at least one captured image forms part of a video image stream captured by the image sensor.

17. The mobile device of claim 10, wherein the device identifier corresponding to the device is a phone number.

18. A mobile device
a memory;
an image sensor;
a proximity sensor, and
a processor coupled to the image sensor, the proximity sensor, and the memory, wherein the processor is configured to:
detect that the mobile device is in communication with one of a plurality of devices, each device in the plurality of devices associated with a corresponding device identifier;
trigger, by the processor, a capture of at least one image by the image sensor based, in part, on:
a device identifier corresponding to the device communicating with the mobile device, and
input from the proximity sensor indicating that a section of the mobile device is in physical contact with a user of the mobile device; and
determine a location of the mobile device based, in part, on the at least one captured image.

19. A mobile device comprising:
means for detecting that that the mobile device is in communication with one of a plurality of devices, each device in the plurality of devices associated with a corresponding device identifier in the stored plurality of device identifiers;
means for triggering, by the mobile device, a capture of at least one image by an image sensing means based, in part, on:
the device identifier corresponding to the device in communication with the mobile device, and
a field of view of the image sensor means as determined based on input from a proximity sensing means on the mobile device indicating that a section of the mobile device is within a threshold proximity of a user of the mobile device; and
means for determining a location of the mobile device based, in part, on the at least one captured image.

20. The mobile device of claim 19 further comprising:
means for transmitting the determined location of the mobile device to the device communicating with the mobile device.

21. The mobile device of claim 19 further comprising:
means for transmitting the at least one captured image to the device communicating with the mobile device.

22. A mobile device comprising:
means for detecting that that the mobile device is in communication with one of a plurality of devices, each device in the plurality of devices associated with a corresponding device identifier in the stored plurality of device identifiers;
means for triggering, by the mobile device, a capture of at least one image by an image sensing means based, in part, on:
the device identifier corresponding to the device in communication with the mobile device, and
a field of view of the image sensor means based on input from a proximity sensing means indicating that a section of the mobile device is in physical contact with the user; and
means for determining a location of the mobile device based, in part, on the at least one captured image.

23. A non-transitory computer-readable medium comprising executable instructions, which when executed by a processor, perform steps in a method for estimating a position of a mobile device, the steps comprising:
detecting that the mobile device is in communication with one of a plurality of devices, each of the plurality of devices associated with a corresponding device identifier;
triggering, by the mobile device, a capture of at least one image by an image sensor coupled to the mobile device, based, in part, on:
a device identifier corresponding to the device communicating with mobile device, and
a field of view of the image sensor as determined based on input from a proximity sensor on the mobile device indicating that a section of the mobile device is within a threshold proximity of a user of the mobile device; and
determining a location of the mobile device based, in part, on the at least one captured image.

24. The non-transitory computer-readable medium of claim 23, further comprising:
transmitting the determined location of the mobile device to the device communicating with the mobile device.

25. The non-transitory computer-readable medium of claim 23, further comprising:
transmitting the at least one captured image to the device communicating with the mobile device.

26. A non-transitory computer-readable medium comprising instructions, which when executed by a processor, perform steps in a method for estimating a position of a mobile device, the steps comprising:
detecting that the mobile device is in communication with one of a plurality of devices, each of the plurality of devices associated with a corresponding device identifier;

triggering, by the mobile device, a capture of at least one image by an image sensor coupled to the mobile device, based, in part, on:
   a device identifier corresponding to the device communicating with mobile device, and
   input from a proximity sensor on the mobile device indicating that a section of the mobile device is in contact with a user of the mobile device; and
determining a location of the mobile device based, in part, on the at least one captured image.

\* \* \* \* \*